(12) United States Patent
Abe et al.

(10) Patent No.: US 7,522,625 B2
(45) Date of Patent: Apr. 21, 2009

(54) PROCESSING METHOD OF FRAGMENTED PACKET AND PACKET TRANSFER EQUIPMENT USING THE SAME

(75) Inventors: Hideo Abe, Kawasaki (JP); Kenji Fukuda, Kawasaki (JP); Susumu Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 11/211,873

(22) Filed: Aug. 25, 2005

(65) Prior Publication Data

US 2006/0039379 A1 Feb. 23, 2006

Related U.S. Application Data

(63) Continuation-in-part of application No. 11/034,631, filed on Jan. 13, 2005, now abandoned.

(30) Foreign Application Priority Data

Aug. 3, 2004 (JP) ............................ 2004-227221
May 31, 2005 (JP) ............................ 2005-158379

(51) Int. Cl.
*H04L 12/28* (2006.01)
*H04L 12/56* (2006.01)
*H04L 12/54* (2006.01)

(52) U.S. Cl. .................... 370/413; 370/415; 370/417; 370/429

(58) Field of Classification Search ......... 370/412–418, 370/428, 429
See application file for complete search history.

(56) References Cited

U.S. PATENT DOCUMENTS 6,792,002 B2   9/2004   Tezuka et al.

FOREIGN PATENT DOCUMENTS

| JP | 2001-223704 | 8/2001 |
| JP | 2002-044141 | 2/2002 |
| JP | 2004-135076 | 4/2004 |

*Primary Examiner*—Ronald Abelson
(74) *Attorney, Agent, or Firm*—Katten Muchin Rosenman LLP

(57) ABSTRACT

The present invention provides a method of high speed assemble process capable of dealing with long packets with effective buffer memories usage. A processing method of fragmented packets in packet transfer equipment for transmitting and receiving packet data between terminals through network, includes, receiving fragmented packets, identifying whether the received packet is a packet fragmented into two from original, or a packet fragmented into three or more, for the packet identified as fragmented into two, storing the two fragmented packets into assembly buffer in fragmentation order, on basis of the respective offset values in the packets, and reading out from top, and for the packet fragmented into three or more, chain-connecting the assembly buffers and storing the packets therein in reception order, reading out the packets after deciding the order by comparing chain information and offset values of the fragmented packets within the chain, and then reassembling the packets.

11 Claims, 26 Drawing Sheets

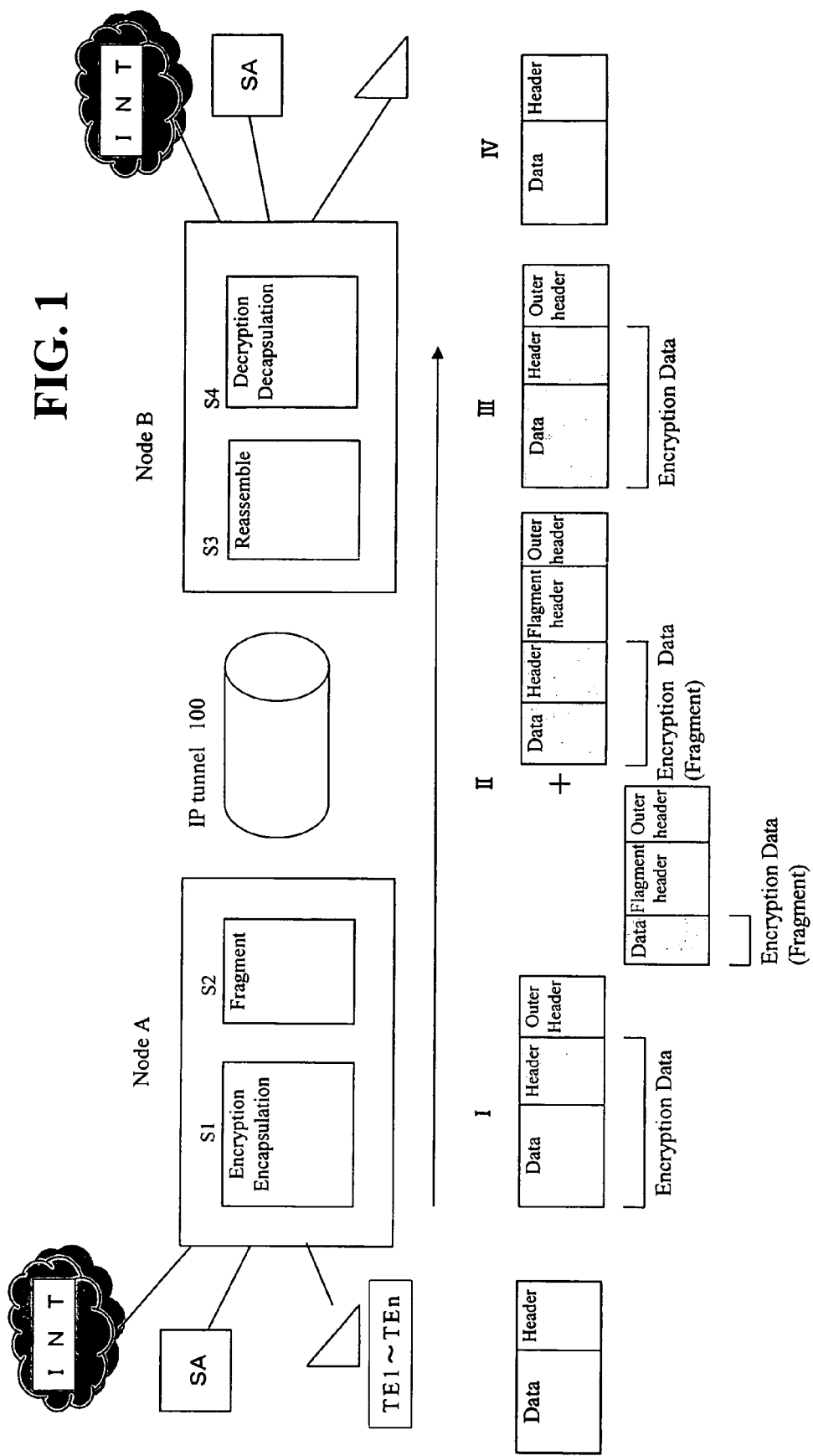

RELATED ART

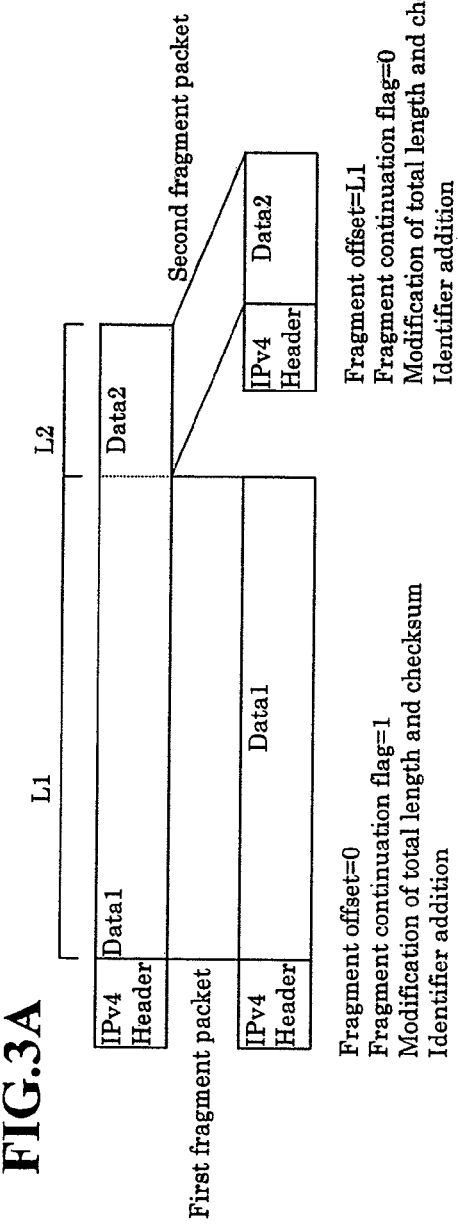
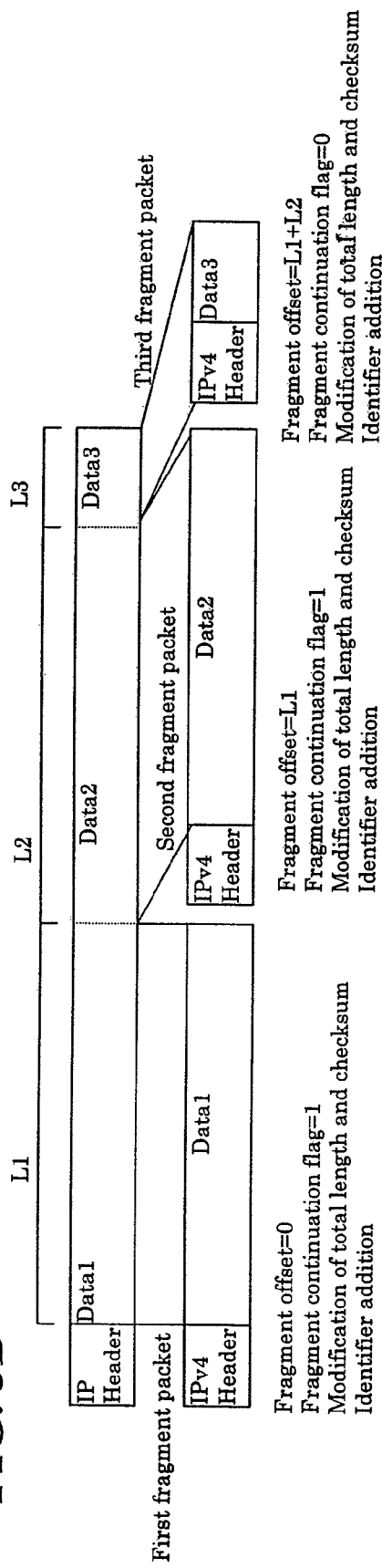
RELATED ART

RELATED ART

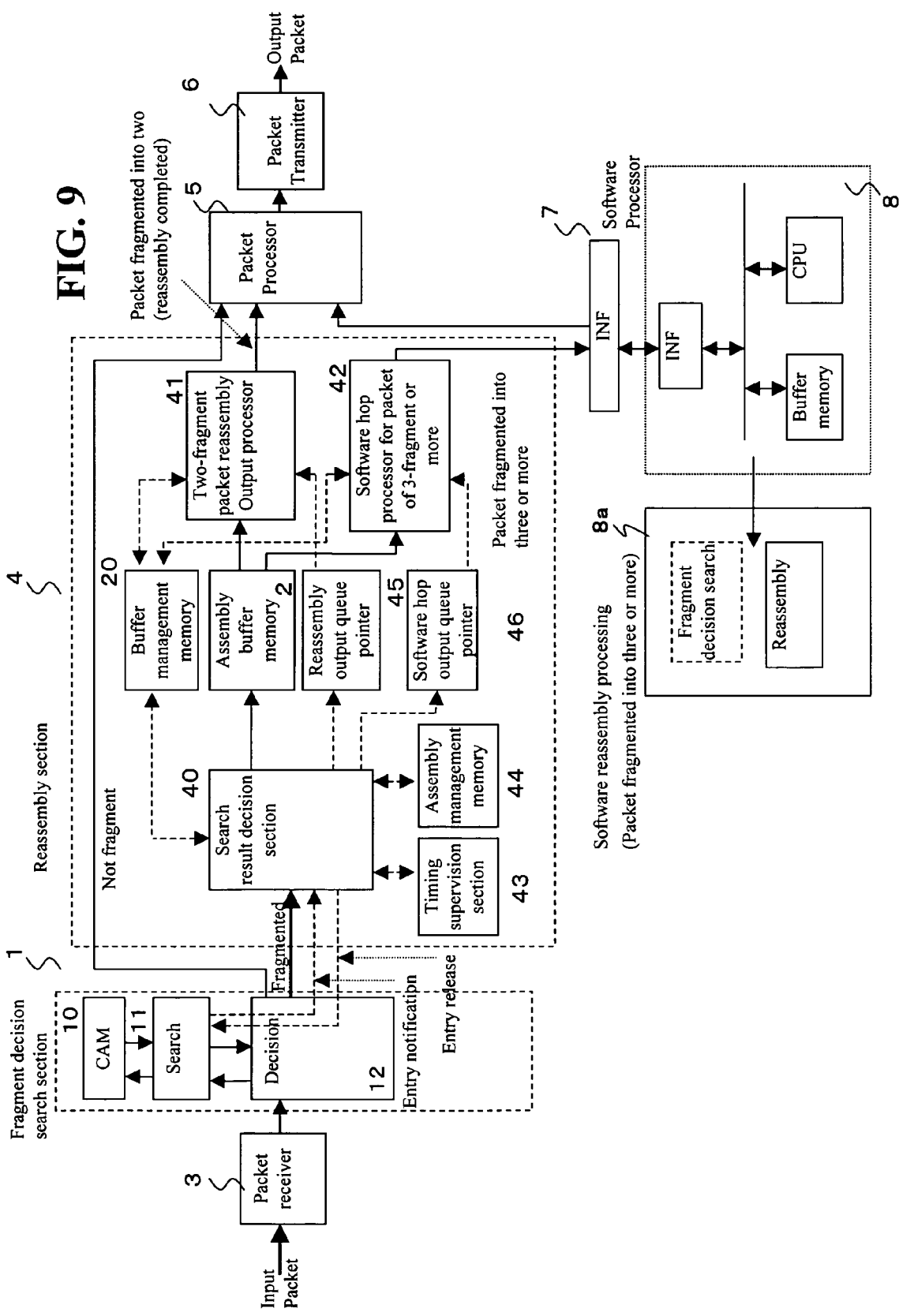

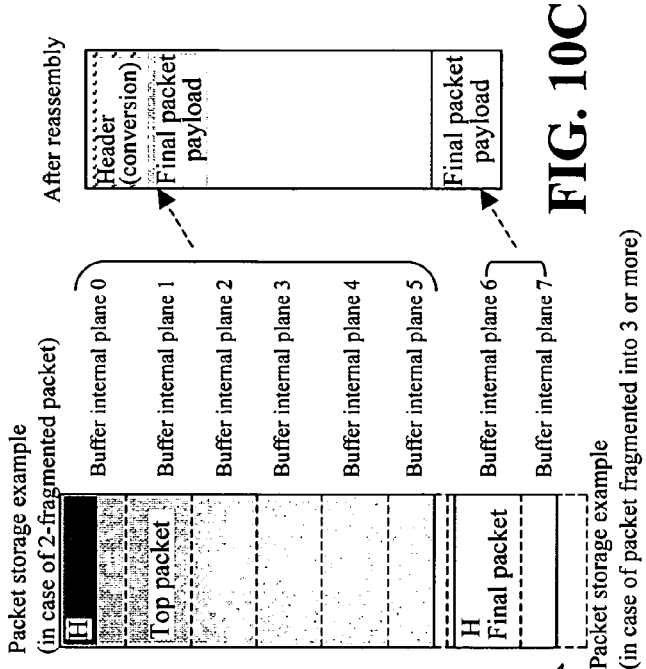
FIG. 10A
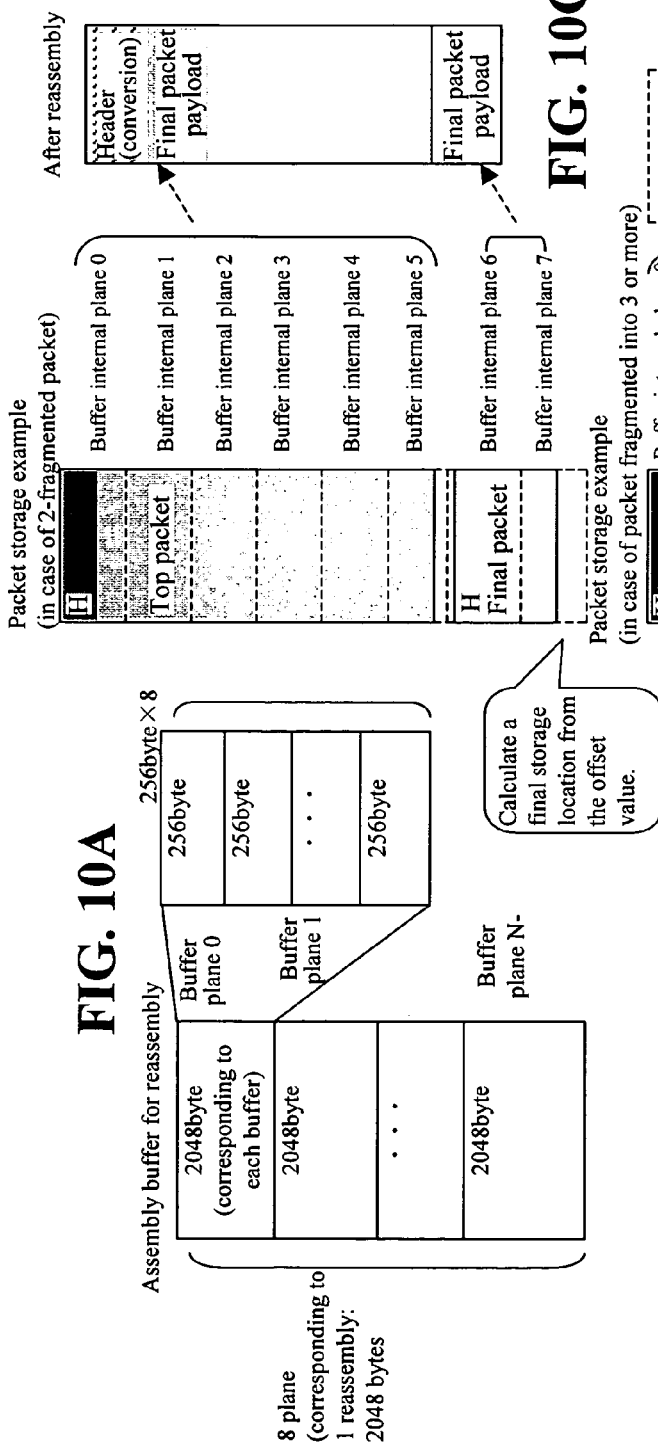
FIG. 10C
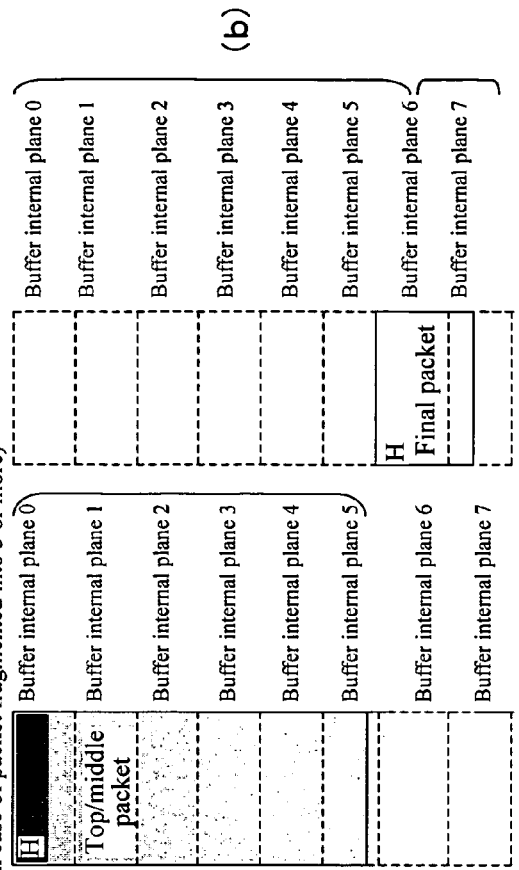
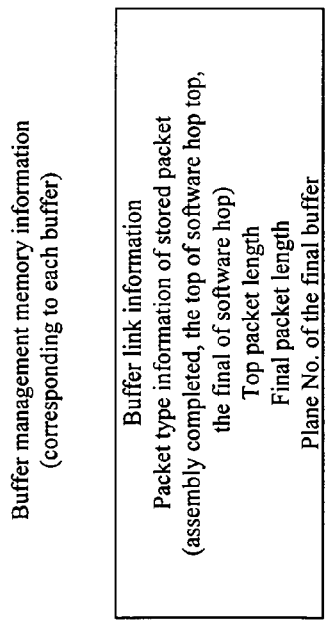
FIG. 10B

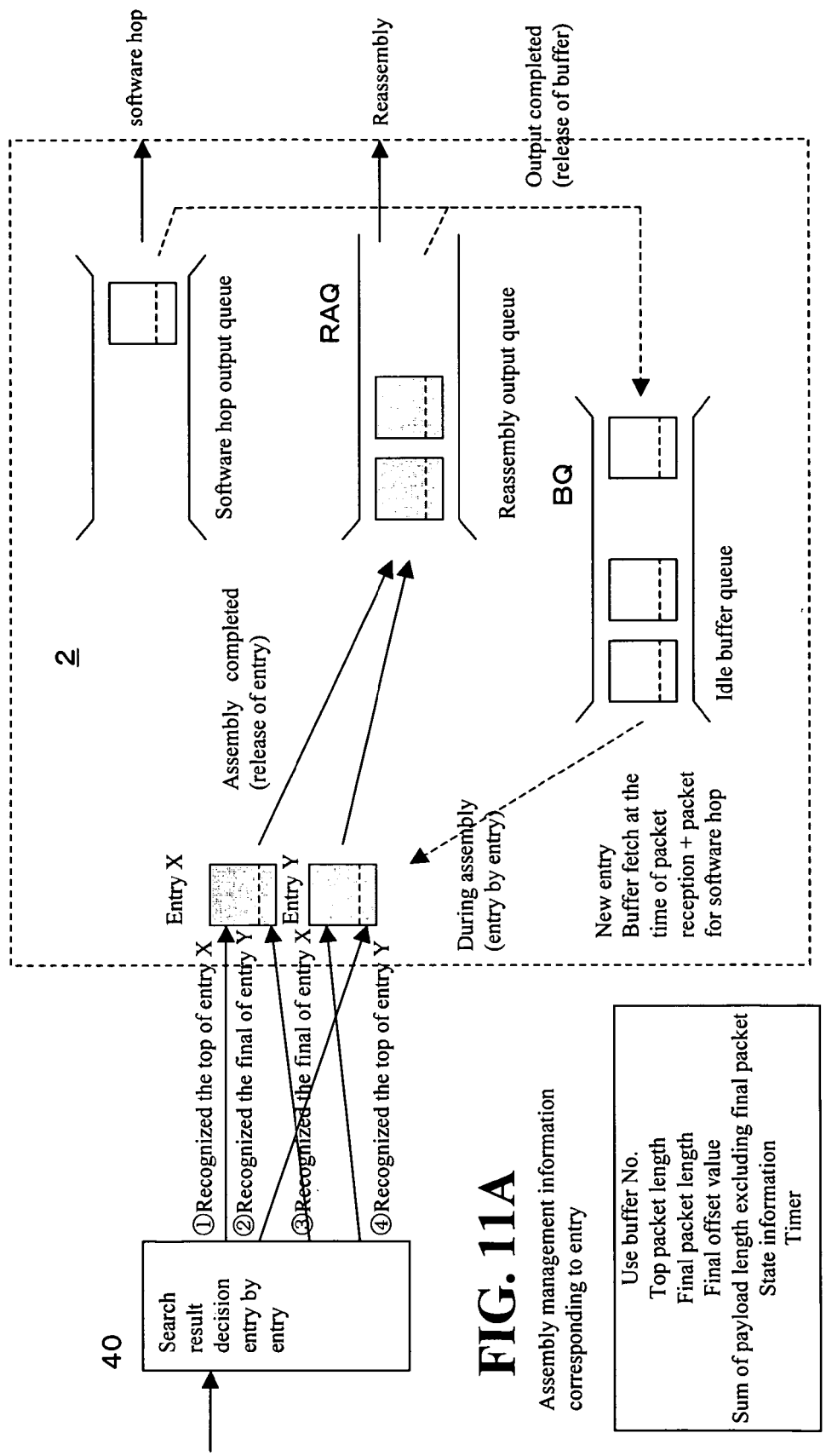

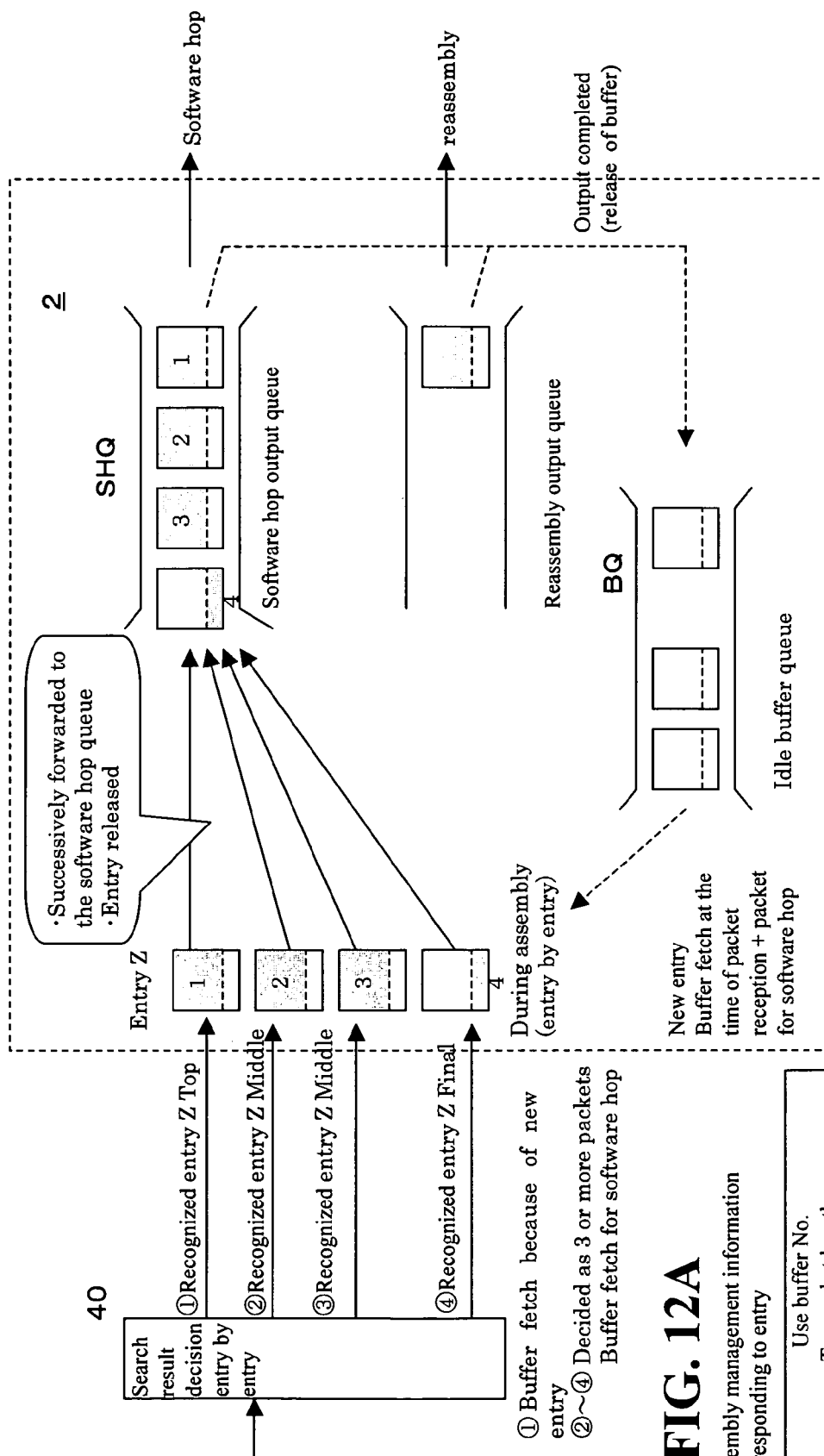

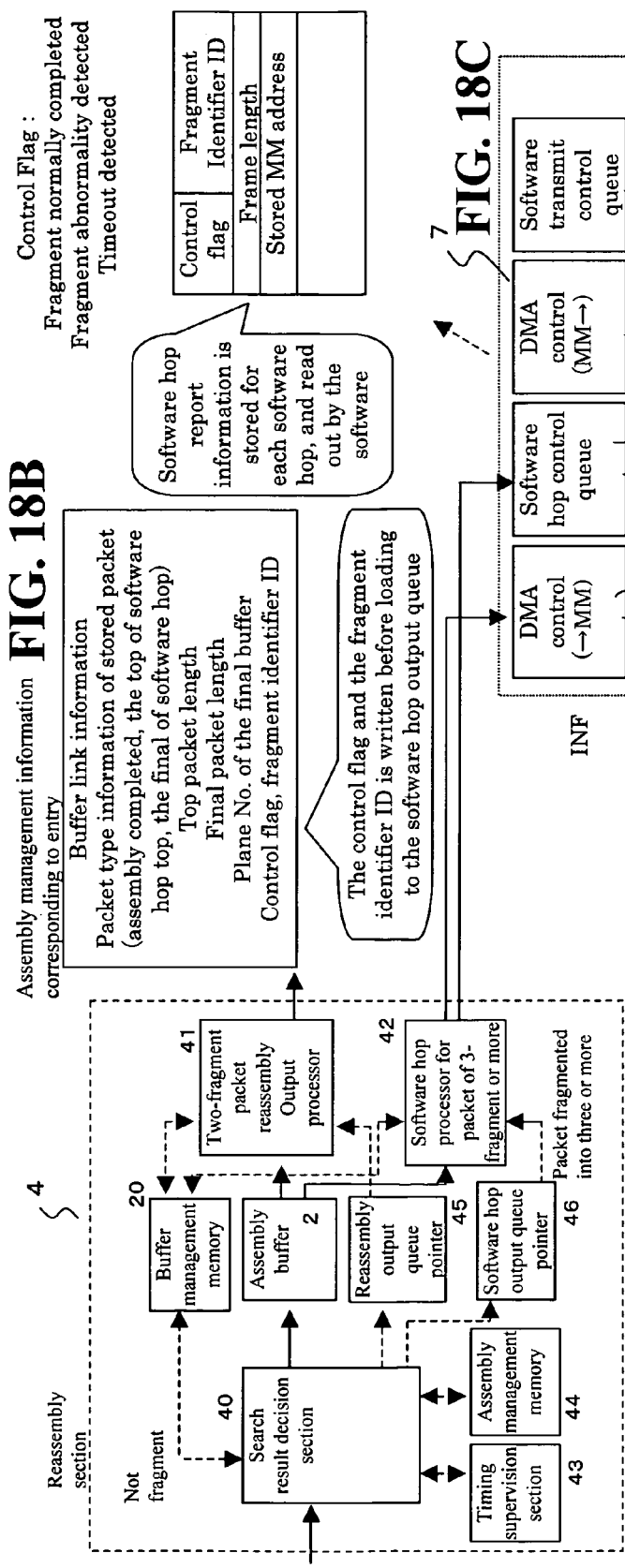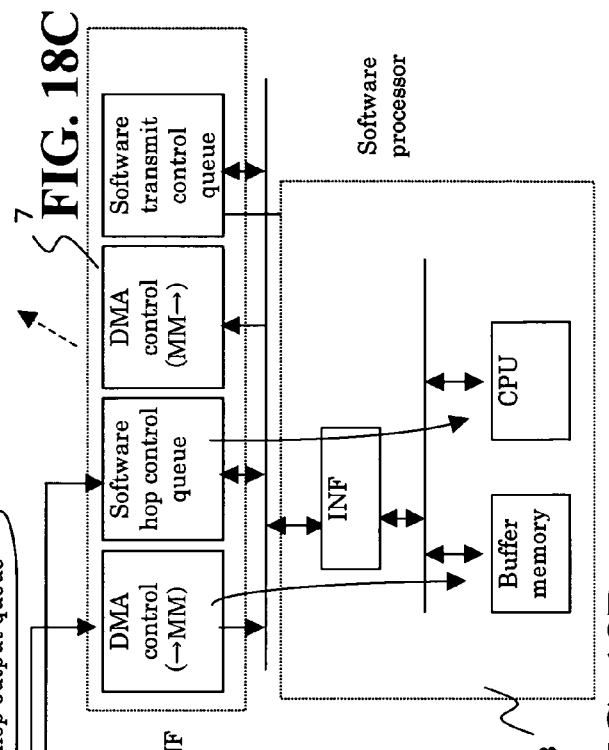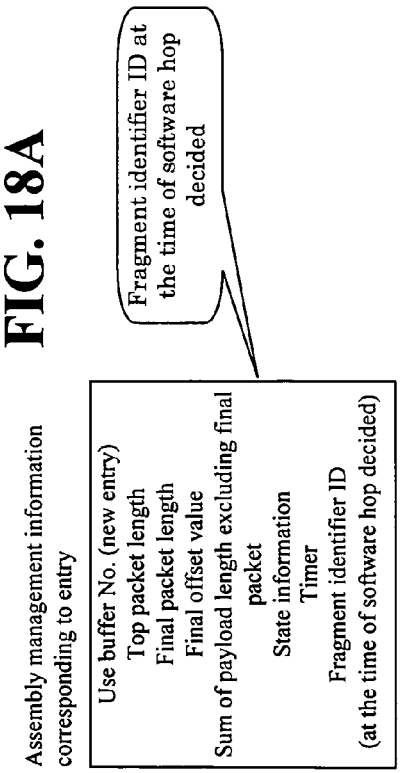

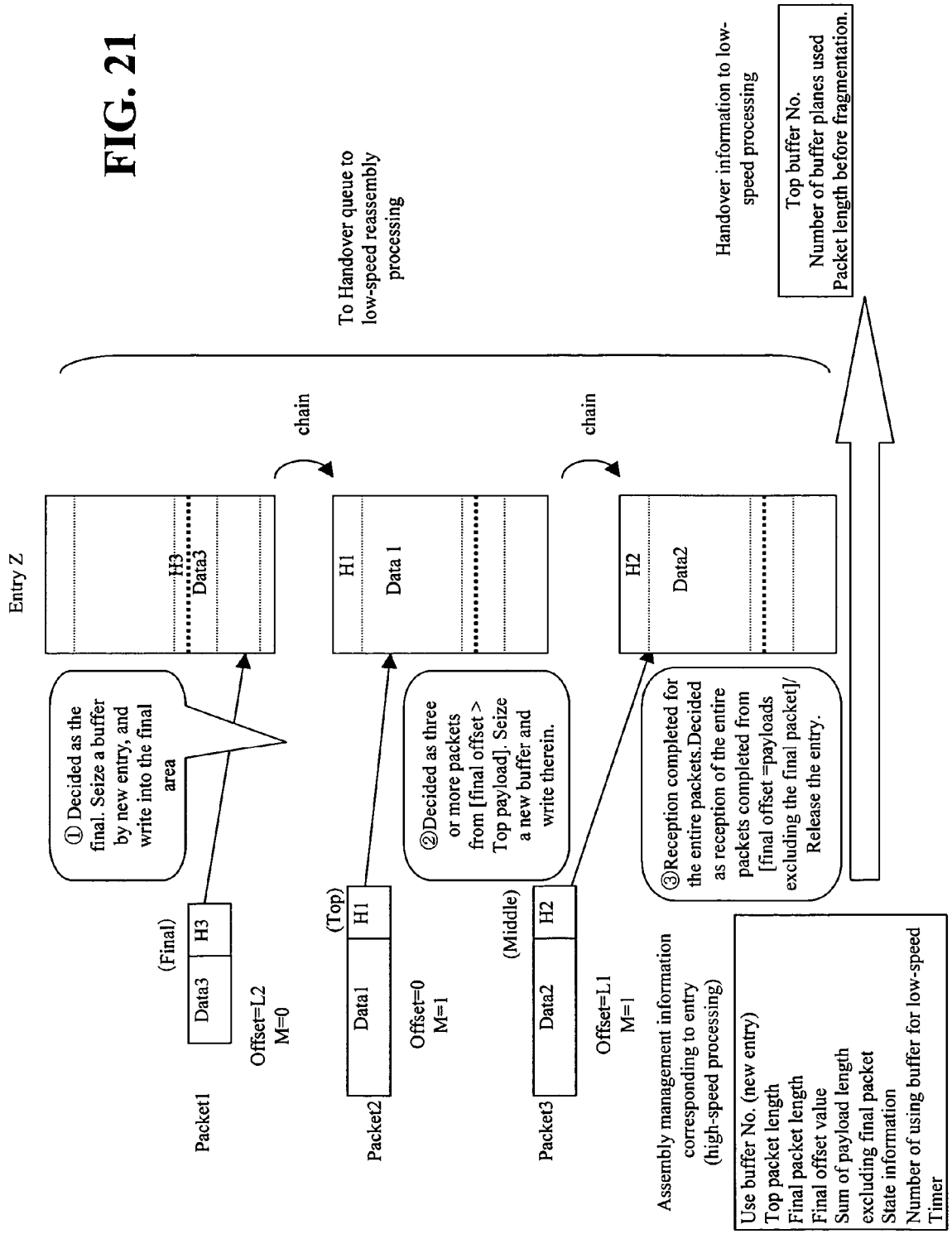

PROCESSING METHOD OF FRAGMENTED PACKET AND PACKET TRANSFER EQUIPMENT USING THE SAME

CROSS-REFERENCE TO RELATED APPLICATIONS

This application is a continuation-in-part of prior application Ser. No. 11/034,631, filed on Jan. 13, 2005 now abandoned. This application is based upon and claims the benefit of priority from the prior Japanese Patent Application No. 2004-227221, filed on Aug. 3, 2004, and the prior Japanese Patent Application No. 2005-158379, filed on May 31, 2005, the entire contents of which are incorporated herein by reference.

BACKGROUND OF THE INVENTION

1. Field of the Invention

The present invention relates to a processing method of a fragmented packet in packet transfer equipment transmitting and receiving a packet data through a network, and packet transfer equipment using the method.

2. Description of the Related Art

Packet transfer equipment for transmitting and receiving a packet data between terminals through a network is conceptually illustrated in a network shown in FIG. 1. In this FIG. 1, the packet transfer equipment is shown as a node A and a node B. In the node A, there is provided encryption and encapsulation functions (S1) of the data which is transmitted from a plurality of terminals TE1-TEn, a server SA, or Internet INT accommodated therein. Further, the encapsulated data is transferred to the node B through an IP tunnel 100.

In the above configured system, when the data transmitted from the terminals TE1-TEn, the server SA or the Internet INT accommodated in the node A is encrypted and encapsulated (S1), a predetermined header is added (I). This may cause a packet length exceeding a maximum transfer byte length (or maximum transmission unit; MTU) which is specified by the network. In such a case, the node A on the transmission side has a function of fragmenting the packet into a plurality of packets, so that each length of the encapsulated packets falls within the MTU value (S2).

Thus, the encrypted data (I) is fragmented (II), and each fragmented packet is forwarded to IP tunnel 100.

Meanwhile, in the node B disposed on the receiving side of IP tunnel 100, the fragmented packets of the encrypted data are reassembled (S3), and thereby encrypted data identical to the encrypted data (I) generated in the node A is obtained (III).

Subsequently, the node B decrypts the encrypted data, and performs decapsulation so as to exclude the outer header (S4). Thus, the pre-encrypted data is obtained (IV).

In FIGS. 2A-3B, examples of fragment formats of the IP packet are shown (FIGS. 2A, 2B show cases of an IPv6 packet, and FIGS. 3A, 3B show cases of an IPv4 packet). In these figures, FIGS. 2A, 3A show cases of fragmentation into two packets, while FIGS. 2B, 3B show cases of fragmentation into three packets.

For example, in FIG. 2A, when fragmenting into two packets, the encapsulated data having an IPv6 header is divided into a data 1 of which length is L1, and a data 2 of which length is L2. Modified IPv6 header and fragment header are added respectively. Thus, the original packet is divided into fragmented packets.

In the IPv6 fragment format shown in FIGS. 2A, 2B, each modified IPv6 header includes a payload length and a modified next header (NH) value, and further, the fragment header is added. Whether or not the fragment header exists can be known from the next header (NH) value in the modified IPv6 header. Thus, using this NH, it is determined whether or not the received packet is a packet having been segmented (fragmented).

Further, the fragment header includes fragment offset value, continuation flag, and identifier. Moreover, the modified IPv6 header includes a source address. Using this source address and the identifier in the fragment header, the original encrypted data packet before segmentation can be identified. Also, using the fragment offset value in each fragment header and fragment continuation flag (1 or 0), each divided fragment data location can be identified.

Using hardware, it is relatively easy to perform the fragment processing (S2) at high speed in the transmission node A according to the fragment formats shown in FIGS. 2A-3B, because the processing can be performed serially packet by packet.

In contrast, as to the reassembly processing (S3) in the reception node B, it is necessary to monitor the reception of the entire fragmented packets, and to reassemble the packets. This reception processing becomes complicated, because the sequence within the fragmented packets may become out of sequence (sequence inversion) in the network, or a plurality of fragmented packets may be received from the network concurrently in a multiplexed form.

FIG. 4 shows a diagram illustrating an exemplary procedure of the reassembly processing (S3) for the fragmented packets. FIG. 5 shows an exemplary configuration of packet transfer equipment on the reception side to which the conventional reassembly processing (S3) is applied. Further, FIG. 6 shows a diagram explaining the reassembly processing shown in FIGS. 4 and 5.

In FIG. 4, a fragment decision search section 1 determines whether or not the packet received in a packet receiver 3 is a fragmented packet, by checking whether a fragment header is existent in a modified IPv6 header or an IPv4 header (process step P1).

If no fragment header is existent, this packet is determined to be not a fragmented packet, and accordingly the packet is forwarded to a packet processor 5 ('N' in process step P1). If a fragment header is existent ('Y' in process step P1), a packet source address (IP_SA) and a fragment identifier ID in the packet header are compared with the entry data having been registered as object packets for reassembly processing, so as to search and identify from which encrypted packet the fragmented packet is produced (process step P2).

As a result of the above search processing, if no matched data is found among the registered objects for reassembly processing ('N' in process step P3), the packet is determined as a new fragmented packet. Accordingly, the source address (IP_SA) and the fragment ID are registered newly as a new entry (process step P4), and the search result indicating a new fragmented packet is reported together with the new entry to a reassembly processor 4 (process step P5).

Meanwhile, if the search results in a match ('Y' in process step P3), the search result indicating packet assembly (reassembly) is proceeding is reported (process step P6). Based on this, from the search result, a fragmented packet of an identical packet is identified using the fragment ID, and the packets are assembled in reassembly processor 4 for each reported entry, in order of the offset values (process step P7).

Thus, on completion of the fragment assembly ('Y' in process step P8), release of the entry is instructed to fragment decision search section 1 (process step P9).

FIG. 6 shows an example of the conventional reassembly processing in the assembly processing (process step P7) shown in FIG. 4.

Referring to the processing shown in FIG. 6, the entry of the packet having been received in packet receiver 3 is searched in fragment decision search section 1. In reassembly processor 4, an assembly buffer 2 of fixed length is assigned correspondingly to each search entry. Here, the prepared number of assembly buffers 2 is identical to the number of entries concurrently processed.

Based on the packet obtained in fragment decision search section 1 and the search information thereof, data parts (data 1, data 2 and data 3) are written in each assembly buffer 2 (i.e. buffer memory for assembly) of which address location corresponds to a fragment offset value L in the packet header, while headers (H1, H2 and H3) are stored in a header storage area 2*a* of assembly buffer 2.

Here, as shown in FIGS. 2A-3B, the header information in the fragmented packet includes the fragment offset value L, and a flag M indicating whether or not a successive packet exists. The fragment offset value L indicates the start position of the payload data relative to the header of the top packet, in which the fragment offset value '0' represents the top packet. As to the flag M, M=1 indicates a successive packet is existent, while M=0 indicates the packet of interest is the final packet.

Next, after the entire fragmented packets are received, in reassembly processor 4, the reassembly processing is performed by successively reading out the packet data from assembly buffer 2 corresponding to the entry. Also, processing including substitution of the header is performed in this reassembly processor 4. Then, the packet is forwarded to packet processor 5, and further transmitted from a packet transmitter 6.

As such, the processing performed in reassembly processor 4 shown in FIG. 6 can be performed at high speed using hardware.

FIG. 7 shows another configuration example of the packet transfer equipment on the reception side, to which the reassembly processing (S3) is applied. FIG. 8 shows an explanation diagram illustrating the reassembly processing shown in FIG. 7.

In the exemplary configuration shown in FIG. 7, when fragment decision search section 1 decides the received packet is a fragmented packet, software processing in a software processor 8 performs the reassembly processing. In FIG. 7, the fragmented packet decided in fragment decision search section 1 is transferred to software processor 8 through an interface 7. The search and assembly processing by software is performed in software processor 8, and after reassembly, the packet is transferred again to packet processor 5 through interface 7.

As shown in FIG. 8, in software processor 8, packets are stored entry by entry in order of reception, in assembly buffer 2 connected by a chain. However, since the stored fragmented packets are not always received in order of fragmentation, after the entire fragmented packets are received, the fragment sequence is determined using the continuation information M and the fragment offset value L stored in each fragment header. Then, by rearranging the sequence (i.e. by reading out the fragments in order of fragmentation), reassembly processing is performed.

This method requires a substantial time for packet sequence decision processing. However, since efficient use of assembly buffer 2 can be attained, the method is effective in such equipment that does not need fast processing, as effective method using software and firmware.

Also, as a technique related to the above, an invention related to packet processing has been disclosed in the official gazette of the Japanese Unexamined Patent Publication No. 2001-223704. In this disclosure, based on an ATM cell received from an extended line, packets are stored in an assembly memory. The packets are read out from the memory, and a packet of which address is resolvable is processed by hardware, while a packet of which address is not resolvable is processed by software.

Now, in packet transfer equipment provided in a system in which encrypted packets are transferred at high speed on the order of Gigabits/sec through IP tunnel 100 as shown in FIG. 1, when a fragmented packet is received, the reassembled packet must be transferred to a decryption section at high speed.

High-speed processing may be actualized if the reassembly processing is performed by hardware, as in the conventional example shown in FIGS. 4 to 6. However, it is not possible to determine the packet length before fragmentation until the reception of the entire fragmented packets is completed. If a buffer of a certain length is prepared in advance, the reassembly cannot be performed when the packet length after reassembly exceeds the prepared buffer length.

In contrast, when reassembly processing is performed for the fragmented packets using software processor 8, as illustrated in the conventional example shown in FIGS. 7 and 8, a problem is that the processing time does not catch up packet reception in case fragmented packets are consecutively received.

Further, when the fragmented packets are to be reassembled in the former processing shown in FIGS. 4 to 6 as described above, securing an area having the maximum packet length after reassembly is required for the packet assembly. Since the upper limit of the packet length flowing on the network may be 64K Bytes, in order to ensure processing for the entire fragmented packet, a buffer memory amounting to 64K Bytes×(concurrent processing number) is necessary. This is very disadvantageous in view of both memory cost and mounting space.

SUMMARY OF THE INVENTION

Accordingly, it is an object of the present invention to provide a method for performing reassembly of entire fragmented packets and packet transfer equipment using the same, enabling high-speed assembly processing with an efficient method of buffer use, with the provision of an assembly means for long packets.

In order to achieve the above-mentioned object, the inventors of the present invention take the following into consideration. Namely, as having been described in FIG. 1, when the packet length exceeds MTU caused by encapsulation and encryption, generally the excess value over MTU amounts to several bytes to several tens of bytes.

Considering MTU in Ethernet (1,500 bytes), it is most efficient to fragment into two packets in view of efficiency in fragmentation and transfer efficiency in the network.

From the above viewpoints, as to fragmentation caused by encapsulation and encryption in IP tunneling, fragmentation into two packets occurs in most cases. Therefore, according to the present invention, a packet fragmented into two packets is discriminated from the other, i.e. a packet fragmented into three or more packets. As to a packet fragmented into two packets, by proving each buffer memory capable of storing two packets, and storing the packets into the buffer according to the offset values, high-speed reassembly processing by hardware is performed.

Meanwhile, as to a packet fragmented into three or more packets, low-speed reassembly processing is performed by transferring the packet to a software processor, etc. Thus, fragmented packets received at high speed, including a long packet, can be reassembled.

The aforementioned high-speed reassembly processor is referred to as a first reassembly processor, whereas the reassembly processor by software processing for the packets fragmented into three or more is referred to as a second reassembly processor.

This processing method has the following feature, which is obtained by process sharing of high-speed reassembly processing and low-speed reassembly processing.

(1) A fragmented packet to be processed by low-speed processing is transferred to the software processor, or the second reassembly processor, in which proprietary reassembly processing is performed. The packet of which reassembly processing is completed is returned to the hardware processor, or the first reassembly processor.

(2) The addition of an entry resulting from the search by the high-speed reassembly processing in the hardware processor is handed over to the software processor, which enables reduction of a software load for searching. Also, loads of the software processor are reduced in the following cases: On the occurrence of an abnormality or a timeout detected in a fragmented packet for the low-speed reassembly processing during assembly processing by the hardware processor, the hardware processor discards the relevant packet(s) left in the buffer memory of the hardware processor. Further, when a part of the fragmented packets has already been transferred to the software processor, the hardware processor notifies the software processor of the packet discard information.

(3) It is also possible that the low-speed reassembly processing is performed by the hardware processor. At this time, a buffer memory used in the high-speed processing is also shared in the low-speed processing, enabling restraint of a buffer memory increase.

Thus, as a first aspect of a processing method of a fragmented packet to meet the aforementioned object, in packet transfer equipment for transmitting and receiving a packet data through a network, the processing method of a fragmented packet includes the steps of: receiving a packet; for the received packet, identifying whether the received packet is a packet fragmented into a predetermined number from an original packet, or a packet fragmented into more than the predetermined number; and for the packet identified as being fragmented into the predetermined number, securing in advance a buffer capable of storing the packets fragmented into the predetermined number, storing the packets fragmented into the predetermined number into an assembly buffer in order of fragmentation, and reading out from the top of the stored packets.

As a second aspect of a processing method of a fragmented packet to meet the aforementioned object, in packet transfer equipment for transmitting and receiving a packet data through a network, the processing method of a fragmented packet includes the steps of: receiving a packet; for the received packet, identifying whether the received packet is a packet fragmented into two from an original packet, or a packet fragmented into three or more; for the packet identified as being fragmented into two, securing in advance a buffer capable of storing two fragmented packets, storing the two fragmented packets into an assembly buffer in order of fragmentation, on a basis of the respective offset values in the packets; and reading out from the top of the stored packets.

As a third aspect of a processing method of a fragmented packet to meet the aforementioned object, in packet transfer equipment for transmitting and receiving a packet data through a network, the processing method of a fragmented packet includes: receiving a packet; for the received packet, identifying whether the received packet is a packet fragmented into two from an original packet, or a packet fragmented into three or more; for the packet identified as being fragmented into two, securing in advance a buffer capable of storing two fragmented packets, storing the two fragmented packets into an assembly buffer in order of fragmentation, on a basis of the respective offset values in the packets, and reading out from the top; and for the packet fragmented into three or more, performing normality check of fragmentation and reception supervision of the entire fragmented packets only, and transferring the received packet to a software processor, and reassembling the packets fragmented into three or more in the software processor.

In the above second and third aspects, for the packet fragmented into three or more, reassembly for the fragmented packets may be performed by chain-connecting the assembly buffers and storing the packets therein in order of reception; and reading out the packets after deciding the sequence by comparing chain information and the offset values of the fragmented packets within the chain.

As a fourth aspect of a processing method of a fragmented packet to meet the aforementioned object, in packet transfer equipment for transmitting and receiving a packet data through a network, the processing method of a fragmented packet includes: receiving a packet; for the received packet, identifying whether the received packet is a packet which is fragmented into two from an original packet, and of which the original packet length is no greater than a predetermined value, or a packet fragmented into three or more; for the packet identified as being fragmented into two, and of which the original packet length is no greater than a predetermined value, securing in advance a buffer capable of storing two fragmented packets, storing the two fragmented packets into an assembly buffer in order of fragmentation, on a basis of the respective offset values in the packets, and reading out from the top; and for the packet fragmented into three or more, and the packet fragmented into two of which the original packet length is greater than a predetermined value, performing normality check of the fragmentation and reception supervision of the entire fragmented packets only, and transferring the received packet to a software processor, and reassembling in the software processor the packets fragmented into three or more, and the packets fragmented into two of which the original packet length is greater than a predetermined value.

In the fourth aspect, for the packet fragmented into three or more, and the packet fragmented into two of which the original packet length is greater than a predetermined value, reassembly of the fragmented packets is performed by chain-connecting the assembly buffers, and storing the packets therein in order of reception, and on receipt of the entire fragmented packets, reading out the packets after deciding the sequence by comparing chain information and the offset values of the fragmented packets within the chain.

As a fifth aspect of the present invention to meet the aforementioned object, packet transfer equipment for transmitting and receiving a packet data through a network has the following features: The packet transfer equipment includes: a packet receiver; a fragment decision search section deciding the packet received in the receiver whether or not the received packet is a fragmented packet, and for the fragmented packet, searching and adding an entry for each packet before fragmentation; and a reassembly section reassembling the packets on an entry-by-entry basis. Here, the reassembly section includes: a decision section deciding whether the fragmented packet is a packet fragmented into a predetermined number from an original packet, or a packet fragmented into more than the predetermined number, and a buffer memory having a buffer for storing the packets decided as being fragmented into the predetermined number in order of fragmentation, and a plurality of buffers for storing the packets fragmented into more than the predetermined number, respectively; a first output processor reading out the packet fragmented into the predetermined number stored in the buffer from the top; and for the packet fragmented into more than the predetermined number, a second output processor performing reception supervision of the entire fragmented packets only, and transferring the received packets from the plurality of buffers. Further, the packet transfer equipment also includes: a software processor performing reassembly of the packets fragmented into more than the predetermined number, which are transferred from the second output processor; and a packet processor multiplexing and outputting the reassembled packets fed from the first output processor and the software processor.

As a sixth aspect of the present invention to meet the aforementioned object, packet transfer equipment for transmitting and receiving a packet data through a network includes: a packet receiver; for the packet received in the buffer, a fragment decision search section deciding whether or not the received packet is a fragmented packet, and for the fragmented packet, searching and adding an entry for each packet before fragmentation; and a reassembly section reassembling the packets on an entry-by-entry basis. Here, the reassembly section includes: a decision section deciding whether the fragmented packet is a packet fragmented into two from an original packet, or a packet fragmented into three or more; a buffer memory having a buffer for storing the packet decided as being fragmented into two in order of fragmentation, and a plurality of buffers for storing the packet fragmented into three or more, respectively; a first output processor reading out the packet fragmented into two and stored in the buffer, successively from the top; and a second output processor for the packet fragmented into three or more, performing reception supervision of the entire fragmented packets only, and transferring the received packet from the plurality of buffers. Further, the packet transfer equipment also includes: a software processor performing reassembly of the packets fragmented into three or more, which are transferred from the second output processor; and a packet processor multiplexing and outputting the reassembled packets fed from the first output processor and the software processor.

As a seventh aspect of the present invention to meet the aforementioned object, packet transfer equipment for transmitting and receiving a packet data through a network includes: a packet receiver; a fragment decision search section deciding the packet received in the receiver whether or not the received packet is a fragmented packet, and for the fragmented packet, searching and adding an entry for each packet before fragmentation; a reassembly section reassembling the packets on an entry-by-entry basis. Here, the reassembly section includes: a decision section deciding whether or not the fragmented packet is a packet which is fragmented into two from an original packet, and of which the original packet length is no greater than a predetermined value; a buffer memory having a first buffer for storing the packet which is decided as being fragmented into two, and of which the original packet length is no greater than a predetermined value, in order of fragmentation, and a plurality of second buffers for storing the packet fragmented into three or more, and the packet fragmented into two of which the original packet length is greater than a predetermined value, respectively; a first output processor reading out the packet fragmented into two and stored in the first buffer from the top; and a second output processor for the packet fragmented into three or more, and the packet fragmented into two of which the original packet length is greater than the predetermined value, performing reception supervision of the entire fragmented packets only, and transferring the received packet from the plurality of second buffers. Further, the packet transfer equipment also includes: a software processor performing reassembly of the packets fragmented into three or more, and the packets fragmented into two, of which the original packet length is greater than the predetermined value, which are transferred from the second output processor; and a packet processor multiplexing and outputting the reassembled packets fed from the first output processor and the software processor.

In the above sixth and seventh aspects, for the fragmented packet transferred from the second output processor to the software processor, packet identification information is added based on an entry number handed over from the reassembly section to the second output processor. Further, in case that the second output processor detects abnormality in the fragmented packet to be transferred to the software processor, and that a portion of the fragmented packets is already transferred to the software processor, the reassembly section discards the fragmented packet of interest and notifies the software processor of the detected abnormality together with the packet identification information.

As an eighth aspect of the present invention to meet the aforementioned object, packet transfer equipment for transmitting and receiving a packet data through a network includes: a packet receiver; a fragment decision section identifying whether a packet received in the packet receiver is a packet fragmented into two from an original packet, or a packet fragmented into three or more; and a reassembly section reassembling the two fragmented packets identified in the fragment decision section. Here, the reassembly section includes: a decision section deciding whether the fragmented packet is a packet fragmented into two from an original packet, or a packet fragmented into three or more; a buffer memory having a buffer for storing the packet decided as being fragmented into two in order of fragmentation, and a plurality of buffers for storing the packet fragmented into three or more, respectively; a buffer memory having a buffer capable for storing the decided packet fragmented into two in advance for the packet decided as being fragmented into two, and for storing the two fragmented packets in order of fragmentation on a basis of the respective offset values in the packets, and a plurality of buffers for storing the packets fragmented into three or more; a first output processor reading out the packet fragmented into two stored in the buffer of the buffer memory from the top; and for the packet fragmented into three or more, a second output processor having a means for storing the packets in to the buffer in order of reception by successively chaining the plurality of buffers in the buffer memory, and after storing the entire fragmented packets into the buffer, handing over buffer chain information while preserving the packet stored in the buffer and packet information in the buffer without modification. Thus, the order of fragmentation is decided based on the buffer chain information and the packet information in the buffer entry by entry, which are handed over from the second output processor, and the packets are read out from the buffer memory in order of fragmentation.

As a ninth aspect of the present invention to meet the aforementioned object, packet transfer equipment for transmitting and receiving a packet data through a network includes: a packet receiver; for the packet received in the receiver, a fragment decision search section deciding whether or not the received packet is a fragmented packet, and for the fragmented packet, searching and adding an entry for each packet before fragmentation; and a reassembly section reassembling the packets on an entry-by-entry basis. Here, the reassembly section includes: a decision section deciding whether or not the fragmented packet is a packet fragmented into two from an original packet, and of which the original packet length is no greater than a predetermined value; a buffer memory having a first buffer for storing the packet which is decided as being fragmented into two, and of which the original packet length is no greater than a predetermined value, in order of fragmentation, and a plurality of second buffers for storing the packet fragmented into three or more, and the packet fragmented into two of which the original packet length is greater than the predetermined value, respectively; a first output processor reading out the packet fragmented into two stored in the buffer of the buffer memory from the top; and a second output processor for the packet fragmented into three or more, and the packet fragmented into two of which the original packet length is greater than the predetermined value, having a means for storing the packets into the buffer in order of reception by successively chaining the plurality of second buffers in the buffer memory, and after storing the entire fragmented packets into the plurality of second buffers, handing over buffer chain information while preserving the packet stored in the buffer and packet information in the buffer without modification. Thus, the order of fragmentation is decided based on the buffer chain information and the packet information in the buffer entry by entry, which are handed over from the second output processor, and the packets are read out from the buffer memory in order of fragmentation.

Further scopes and features of the present invention will become more apparent by the following description of the embodiments with the accompanied drawings.

BRIEF DESCRIPTION OF THE DRAWINGS

FIG. 1 shows an explanation diagram illustrating a system for transmitting and receiving a packet data between terminals through a network.

FIGS. 3A and 3B show diagrams illustrating examples of IP packet fragment formats (IPv4).

FIG. 9 shows a diagram illustrating a first embodiment of the present invention.

FIGS. 10A to 10C show a configuration example of an assembly buffer 2 for reassembly, according to the first embodiment of the present invention.

FIGS. 11A, 11B show diagrams illustrating buffer storage control and assembly control for a packet fragmented into two packets, according to the first embodiment of the present invention.

FIGS. 12A, 12B show diagrams illustrating buffer storage control and assembly control for a packet fragmented into three or more packets, according to the first embodiment of the present invention.

FIGS. 18A to 18D show an exemplary notification of fragment identification information to a software processor when performing software hop processing for a packet fragmented into three or more packets.

FIG. 21 shows a diagram illustrating writing of a packet fragmented into three or more packets into a buffer.

DETAILED DESCRIPTION OF THE INVENTION

Figure 2A:
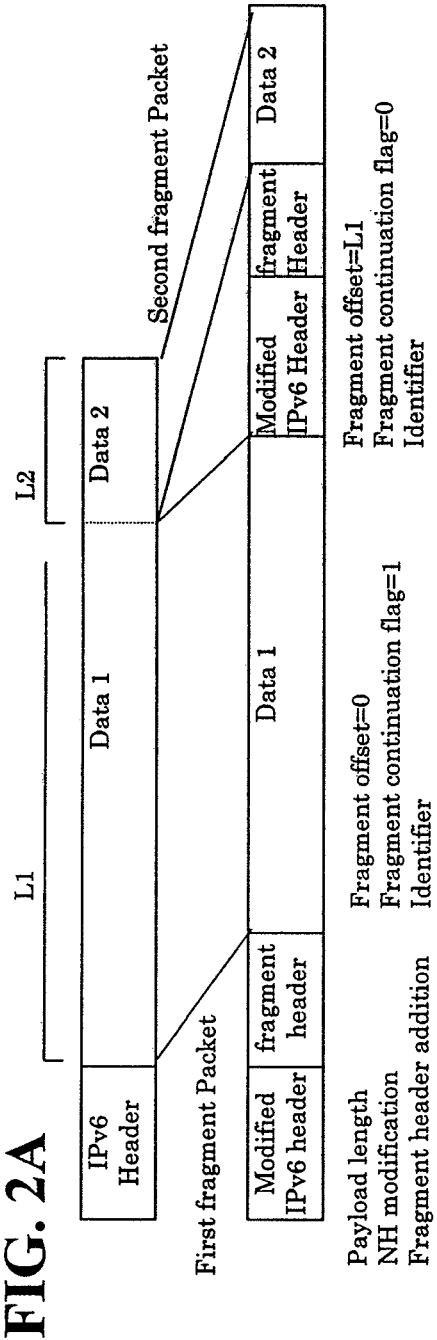
FIGS. 2A and 2B show diagrams illustrating examples of IP packet fragment formats (IPv6).
Figure 2B:
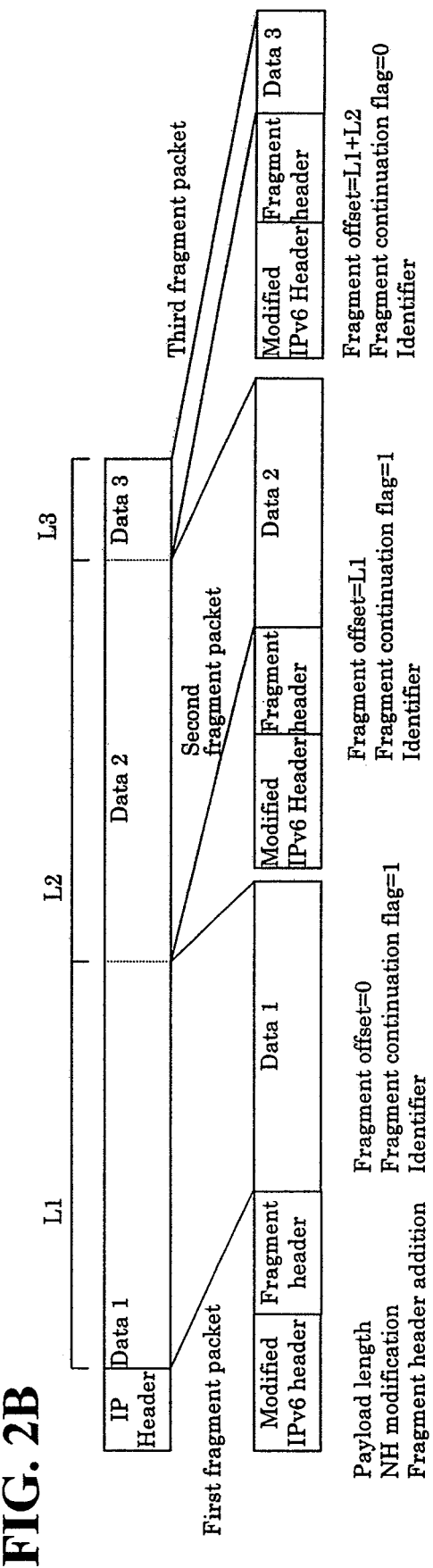
Figure 4:
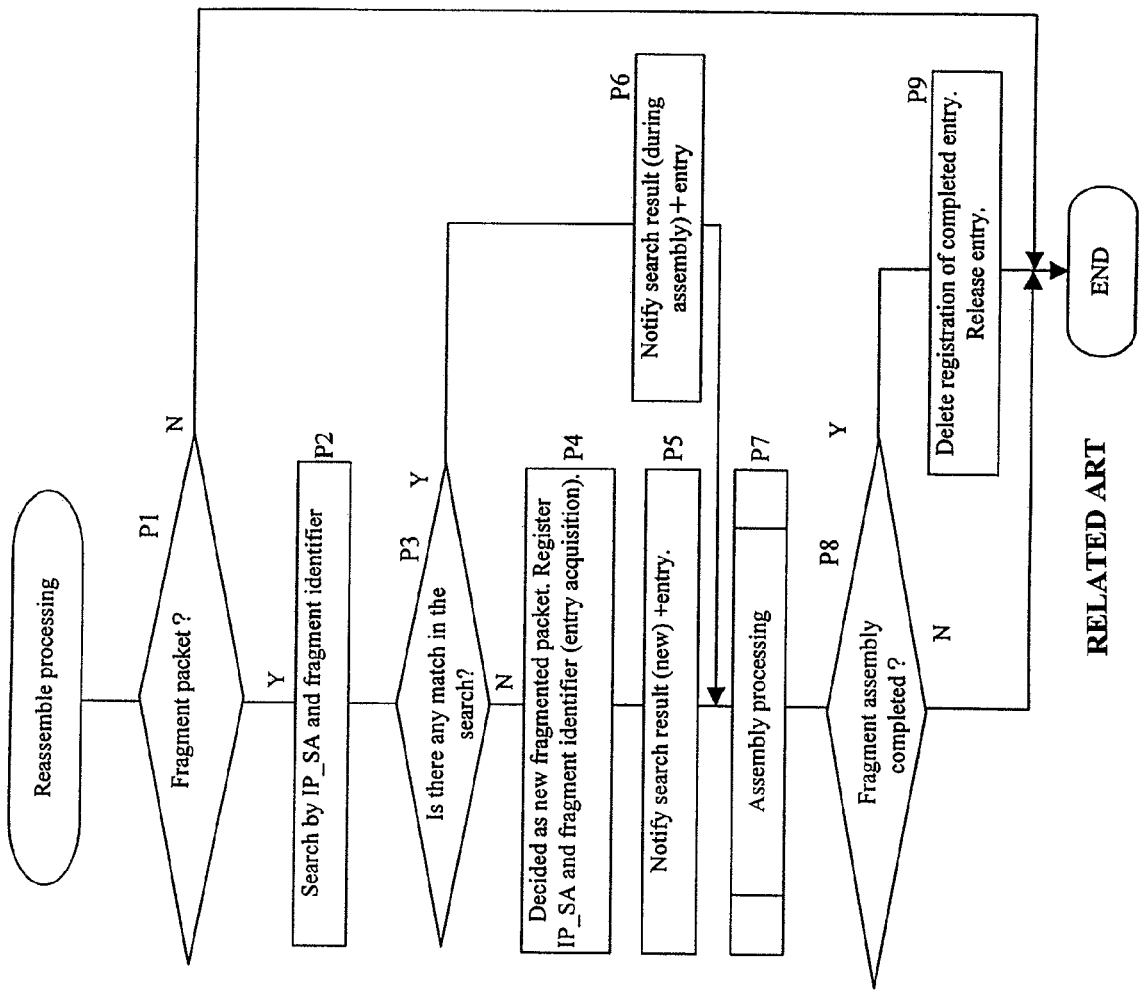
FIG. 4 shows a diagram illustrating an exemplary procedure of the reassembly processing (S3) for fragmented packets.

The preferred embodiment of the present invention is described hereinafter referring to the charts and drawings. However, it is noted that the scope of the invention is not limited to the embodiments described below.

FIG. 9 shows a diagram illustrating a first embodiment of the present invention. In FIG. 9, a configuration example of the packet transfer equipment performing the reassembly processing is shown. In this configuration example, reassembly is performed by shared processing constituted of the high-speed reassembly processing performed by the above first reassembly processor and the low-speed reassembly processing performed by the second reassembly processor, based on the methods (1) and (2) explained earlier.

In FIG. 9, fragment decision search section 1 includes a content addressable memory (CAM) 10. For a reception packet received in packet receiver 3, a search tool 11 refers to CAM 10 and searches reception packet entries having been registered in CAM 10, under the control of a decision control section 12 of fragment decision search section 1.

Further, fragment decision search section 1 decides whether there is a fragment header by checking a modified next header (NH) in case of the IPv6 format, as described earlier. On deciding that the packet is a fragmented packet having the fragment header, fragment decision search section 1 informs a reassembly section 4 of the packet after adding an entry number for the respective packets before fragmentation, based on the source IP address and the fragment ID in the header information. On the other hand, on deciding that the packet is not a fragmented packet, the packet concerned is forwarded to a packet processor 5 without any modification to the packet concerned.

Reassembly section 4 identifies whether the packet concerned is fragmented into two packets, or fragmented into three or more packets. As to the packet fragmented into two packets, reassembly section 4 performs high-speed reassembly, and forwards the reassembled packet to packet processor 5. In contrast, as to the packet fragmented into three or more packets, reassembly section 4 forwards the packet to software processor 8.

In order to manage the assembly processing, an assembly management memory 44 is provided, in which assembly management information is stored entry by entry. An assembly state is managed until the entire fragmented packets are completely received.

An assembly buffer 2, which is a buffer memory used for reassembly, is divided into a plurality of buffers of a fixed length, each capable of storing a packet fragmented into two. Considering that most packets divided into two fragments are those of which length exceeds the MTU value caused by encryption and encapsulation, if the buffer length is set to a value exceeding the MTU value by a certain amount, more efficient use of assembly buffer 2 can be attained.

In this case, when a packet is fragmented into two, and of which the packet length before fragmentation is not greater than a certain value, high-speed reassembly processing is performed for the packet of interest. Further, in a buffer management memory 20, buffer management information, which includes link control between the buffers and packet control information, is stored for each buffer.

Now, FIGS. 10A to 10C show a configuration example of an assembly buffer 2 for reassembly according to the first embodiment of the present invention. According to this embodiment, taking memory access efficiency (burst access) into consideration, one buffer (buffer plane) length is defined as 2,048 bytes (=256 bytes×8) with an access unit of 256 bytes (refer to FIG. 10A). In buffer management memory 20, buffer link information, packet type information of the stored packet, packet length stored, storage location information, etc. are stored for each buffer (FIG. 10B). As to the received fragmented packet, the top packet is stored from the top of a buffer, and the final packet is stored from the top of the buffer corresponding to an internal plane number in the buffer calculated from the offset value.

Here, in FIG. 10C, (a) is an example of packet storage in case of a packet fragmented into two, while (b) is an example of packet storage in case of a packet fragmented into three or more packets.

FIGS. 11A, 11B are diagrams illustrating buffer storage control and assembly control for a packet fragmented into two packets, according to the embodiment of the present invention.

As shown in FIG. 11A, assembly management memory 44 includes a buffer count in use, lengths of the top packet and the final packet, offset value of the final packet, sum of the payload lengths except for the final packet, assembly state information, and timer value for timing supervision during receiving of the entire fragmented packets.

In FIG. 11B, as to the packet fragmented into two packets and output from a search result decision section 40, the packets are stored in calculated positions of assembly buffer 2, depending on the top packet and the final packet for each entry (in the figure, entries X and Y are illustrated). On completion of assembly, the stored buffer is linked to a reassembly output queue RAQ, and the entry is released for a new fragmented packet (BQ). The packet once retained in the reassembly output queue RAQ is read out by a reassembly output processor 41, based on the buffer management information stored in buffer management memory 20. After the data parts are combined, as well as header generation, the packet is fed to reassembly processing.

FIGS. 12A, 12B are diagrams illustrating the buffer storage control and assembly control for a packet fragmented into three or more packets, according to the embodiment of the present invention.

In FIG. 12B, as to the packet received first, the identical processing to that shown in FIG. 11B is performed when it cannot be decided whether or not the packet is fragmented into two packets. However, by the secondly received packet, based on the offset value L and the continuation information M, it is known without exception whether or not the packet concerned is a packet fragmented into two. Therefore, at this time, when it is determined the packet is fragmented into three or more, a new buffer is seized for storing the second packet, and the second packet is stored therein.

Because the packet concerned is decided to be processed by a software hop, the first packet storage buffer and the second packet storage buffer are once retained in a software hop output queue SHQ. Also, since it has already been decided the relevant packet(s) is to be forwarded to the software hop, the third packet is also stored in a newly seized buffer, and is retained once in the software hop output queue SHQ.

The fragmented packets accumulated in the software hop output queue SHQ are successively forwarded to software processor 8 by a software hop output processor 42, according to a software hop output queue pointer 46.

The decision of whether the entire fragmented packets have been received is performed by referring to the assembly management information corresponding to each entry in assembly management memory 44 shown in FIG. 12A. It is decided by checking whether the offset value in the final packet coincides with the sum of the payload lengths of the packets other than the final packet.

Figure 8:
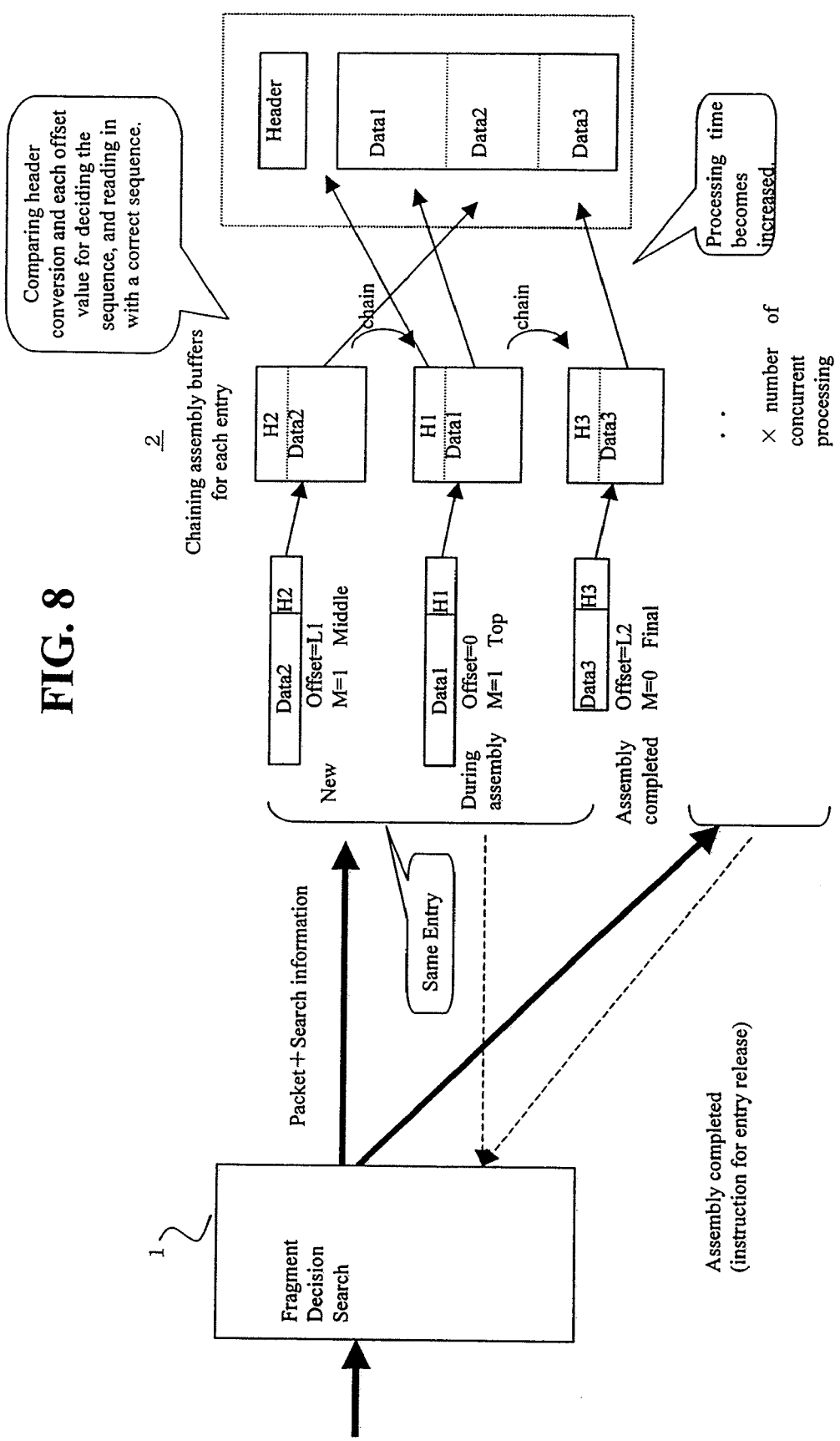
FIG. 8 shows an explanation diagram illustrating the reassembly processing shown in FIG. 7.

In software processor 8, as one example, the reassembly processing is performed according to the method explained earlier in FIG. 8. Namely, the packet fragmented into three or more are chain-connected and stored, in order of reception. When reading out the fragmented packets, the sequence thereof is determined by comparing the offset values, and reassembly of the fragments is performed accordingly.

Here, in every assembly processing, during assembling (from the time of reception of the first fragment of the packet to the time of reception of the entire packets), reassembly section 4 supervises timing, entry by entry, in a timing supervision section 43. When a timeout occurs, the received packet is discarded.

On completion of the assembly, or on the occurrence of discard because of abnormality, the management information of the corresponding entry is erased from assembly management memory 44, and a notification indicating the entry is released is forwarded to fragment decision search section 1.

Further, on completion of the reassembly processing shown in FIGS. 11, 12 or the software hop processing performed in software processor 8, buffers in assembly buffer 2 having been retained so far are released.

Figure 13:
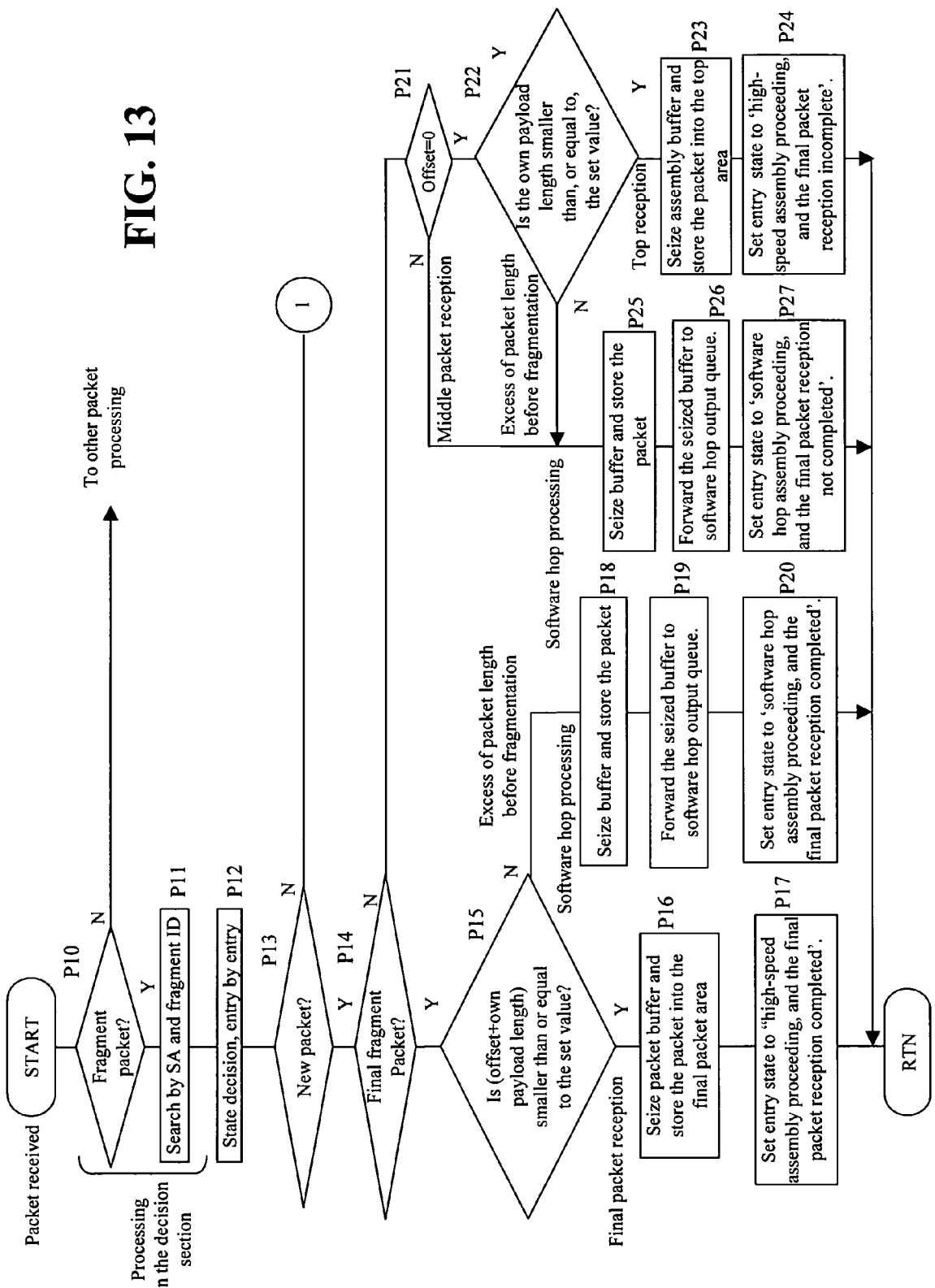
FIG. 13 shows a flowchart (part 1) representing processing procedures for search result decision and assembly control in reassembly processing according to the first embodiment of the present invention.
Figure 14:
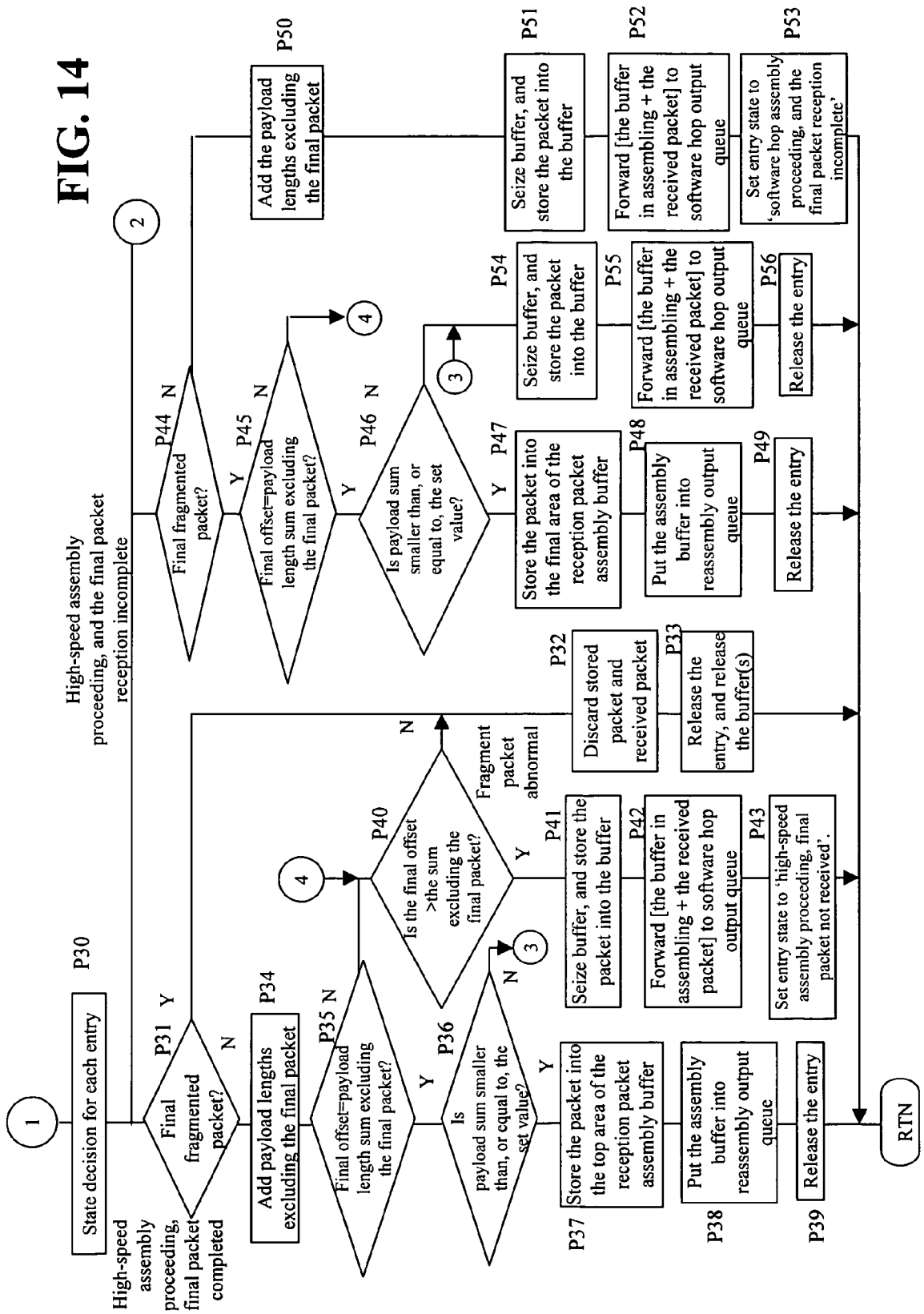
FIG. 14 shows a flowchart (part 2) representing processing procedures for search result decision and assembly control in reassembly processing according to the first embodiment of the present invention.
Figure 15:
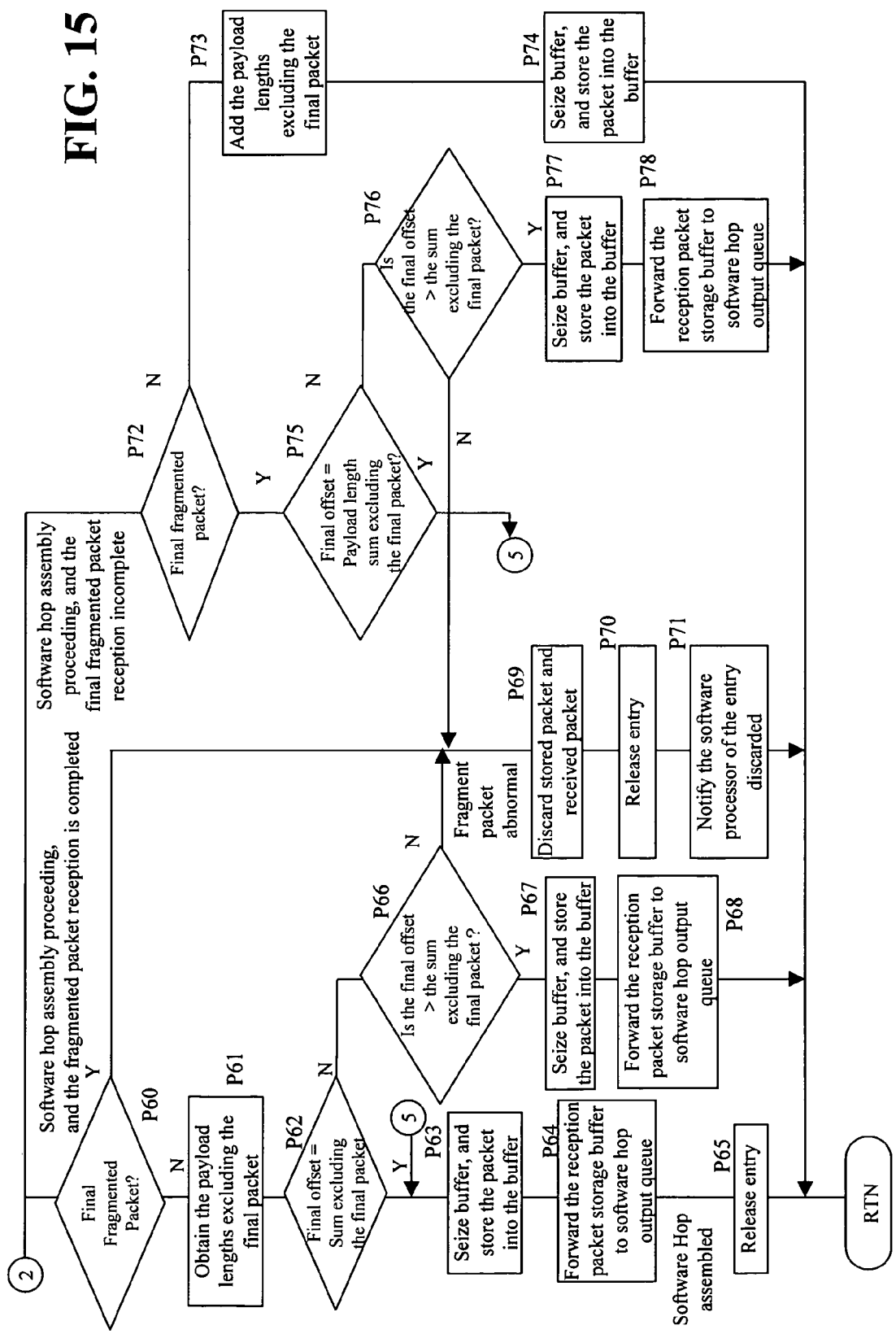
FIG. 15 shows a flowchart (part 3) representing processing procedures for search result decision and assembly control in reassembly processing according to the first embodiment of the present invention.

FIGS. 13 through 15 are flowcharts representing processing procedures for the search result decision and assembly control in the reassembly processing according to the first embodiment of the present invention.

In FIG. 13, when packet receiver 3 receives a packet, fragment decision search section 1 decides whether the received packet is a fragmented packet (process step P10), and searches CAM 10 using the source address SA and the fragment ID as search keys (process step P11).

Next, packet assembly management section 40 refers to state indication of assembly management memory 44, and performs state decision on the input fragmented packet on an entry-by-entry basis (process step P12). In this decision, if the packet is decided as a new entry ('Y' in process step P13), then whether the packet is a final fragmented packet is decided. If the packet is the final fragmented packet ('Y' in process step P14), then it is decided whether the sum of the offset value and the payload length in the packet concerned is not greater than a set value (process step P15).

If the sum of the offset value and the payload length is smaller than, or equal to, the set value ('Y' in process step P15), because the fragmented packet is the final packet, packet assembly management section 40 seizes an assembly buffer and stores the packet into the final packet area (process step P16). Then, the corresponding entry state in assembly management memory 44 is set to an indication of 'high-speed assembly proceeding, and the final packet reception completed' (process step P17).

In the process step P15, when the sum of the offset value and the payload length in the packet concerned exceeds the set value ('N' in process step P 15), packet assembly management section 40 seizes a buffer and stores the packet therein, even when the number of fragments is not 'three or more', so that the software hop processing is performed in software processor 8 (process step P18). Next, the seized buffer is forwarded to software hop output queue SHQ (process step P19), and the corresponding entry state in assembly management memory 44 is set to 'software hop assembly proceeding, and the final packet acceptance completed' (process step P20).

Further, in the process step P14, if it is decided the fragmented packet is not the final packet ('N' in process step P14), and the offset value is zero ('Y' in process step P21), then it is decided the fragmented packet is a top packet.

Also, if the payload length of the packet concerned is smaller than or equal to the set value ('Y' in process step P22), because the received fragmented packet is the top packet, packet assembly management section 40 adds the payload length, seizes an assembly buffer, and stores the received packet into the top packet area (process step P23). Thereafter, the corresponding entry state in assembly management memory 44 is set to 'high-speed assembly proceeding, and the final packet reception not completed' (process step P24).

Further, when the offset value is not zero ('N' in process step P21), it is decided the packet concerned is a middle fragmented packet among three or more fragments. Also, if the packet concerned is the top packet of the packet fragmented into two, but the payload length of the packet concerned is greater than the set value ('N' in process step P22), the packet concerned is decided to be an object of software hop processing, as described earlier in the process step P15.

Accordingly, as in the case of the middle fragmented packet among the three or more fragments, in order to perform the software hop processing, a buffer is seized and the packet is stored into the buffer (process step P25). Then, the seized buffer is forwarded to the software hop output queue SHQ (process step P26), and the corresponding entry state in assembly management memory 44 is set to 'software hop assembly proceeding, and the final packet reception not completed' (process step P27).

Next, in the process step P13, if it is decided the packet is not a packet of new entry ('N' in process step P13), the process proceeds to the processing shown in FIG. 14, in which the state decision is performed correspondingly to each entry state stored in assembly management memory 44 (process step P30).

In this state decision, in case of high-speed assembly proceeding and the final packet reception completed, if the packet is decided as the final fragmented packet ('Y' in process step P31), both the packet(s) having been stored and the received packet are discarded (process step P32). Also, the entry and the assembly buffer(s) are released (process step P33).

If the packet is not the final packet ('N' in process step P31), then the payload lengths excluding the final packet payload are added (process step P34). At this time, if the final offset value is equal to the sum of the payload lengths in the packets excluding the final packet ('Y' in process step P35), and further, if the payload sum is smaller than, or equal to, the set value ('Y' in process step P36), the received packet is stored into the top packet area of assembly buffer 2, which is a buffer memory for assembling the received packets (process step P37).

Subsequently, assembly buffer 2 is forwarded to reassembly output queue RAQ (process step P38), and the entry is released (process step P39).

In the above process step P35, if the final offset value is not equal to the sum of the packet payload values of the packets excluding the final packet, and the final offset value is greater than the above sum of the packet payload values excluding the final packet ('Y' in process step P40), then the packet is decided as a packet fragmented into three or more packets. Then, a buffer is seized and the packet is stored therein, to forward to the software hop processing (process step P41). Subsequently, the buffer by which assembly is proceeding, as well as the received packet, is forwarded to the software hop output queue SHQ (process step P42), and the entry state is set to 'software hop assembly proceeding, and the final packet acceptance completed' (process step P43).

The processing in the state of 'high-speed assembly proceeding, and the final packet reception incomplete' is performed as follows. First, it is decided whether or not the received packet is a final fragmented packet (process step P44). When the received packet is the final fragmented packet, if the offset value of the final packet is equal to the sum of the payload lengths excluding the final packet ('Y' in process step P45), it is further decided whether the payload sum is smaller than, or equal to, the set value. If the payload sum is smaller than, or equal to, the set value ('Y' in process step P46), then the received packet is stored into the final packet area of the reception packet assembly buffer 2 (process step P47). Further, the assembly buffer is forwarded to the reassembly output queue RAQ (process step P48), and then the entry is released (process step P49).

In the process step P44, if the packet is not the final fragmented packet ('N' in process step P44), then the packet is decided as a packet fragmented into three or more packets, and the payload lengths excluding the final packet are added (process step P50). Then a buffer is seized and the packet is stored therein (process step P51), and the buffer in assembling and the received packet are forwarded to the software hop output queue SHQ (process step P52). Further, the entry state is set to 'software hop assembly proceeding, and the final packet reception incomplete' (process step P53).

Further, in the process step P45, if the offset value of the final packet is not equal to the sum of the payload lengths excluding the final packet ('N' in process step P45), then the process proceeds to the process step P40 and the subsequent steps.

Also, in the process step P46, if the payload sum exceeds the set value, then a buffer is seized and the packet is stored therein (process step P54). Then, the buffer in assembling and the received packet are forwarded to the software hop output queue SHQ (process step P55), and the entry is released (process step P56).

Now, in the entry-by-entry state decision (process step P30), the process performed when the software hop assembly is proceeding is illustrated in the flowchart shown in FIG. 15.

In the case of the software hop assembly proceeding and the fragmented packet has been accepted, if the received packet is not the final fragmented packet ('N' in process step P60), then the sum of the payload lengths excluding the final packet is calculated (process step P61). On deciding the final offset is equal to the sum of the payload lengths excluding the final packet ('Y' in process step P62), a buffer is seized and the packet is stored therein (process step P63). Subsequently, the reception packet storage buffer is forwarded to the software hop output queue SHQ (process step P64), and the software hop assembly is completed. Then, the entry is released (process step P65).

In process step P62, in the case that the final offset is not equal to the sum of the payload lengths excluding the final packet, and that the final offset exceeds the sum of the payload lengths excluding the final packet ('Y' in process step P66), a buffer is seized and the packet is stored therein (process step P67). Subsequently, the reception packet storage buffer is forwarded to the software hop output queue SHQ (process step P68).

In the process step P60, if the packet is the final fragmented packet ('Y' in process step P60) and also, in the process step P66, if the final offset value does not exceed the sum of the payload lengths excluding the final packet ('N' in process step P66), then the packet(s) having been stored and the received packet are discarded (process step P69), and the entry is released (process step P70), and the discarded entry is reported to the software processor 8 (process step P71).

Meanwhile, in case of 'the software hop assembly proceeding, and the final fragmented packet reception incomplete', whether or not the packet is the final fragmented packet is decided (process step P72). If the packet is not the final fragmented packet ('N' in process step P72), then the sum of the payload lengths excluding the final packet is calculated (process step P73), and a buffer is seized and the packet is stored therein (process step P74).

If the packet is the final fragmented packet ('Y' in process step P72), and when the final offset value is equal to the sum of the payload lengths excluding the final packet ('Y' in process step P75), the process proceeds to the process step P63. When the final offset exceeds the sum of the payload lengths excluding the final packet ('Y' in process step P76), a buffer is seized and the packet is stored therein (process step P77), and the reception packet storage buffer is forwarded to the software hop output queue SHQ (process step P78).

When the final offset is not greater than the sum of the payload lengths excluding the final packet ('N' in process step P76), the process then proceeds to the process step P69 and the subsequent steps.

Figure 16:
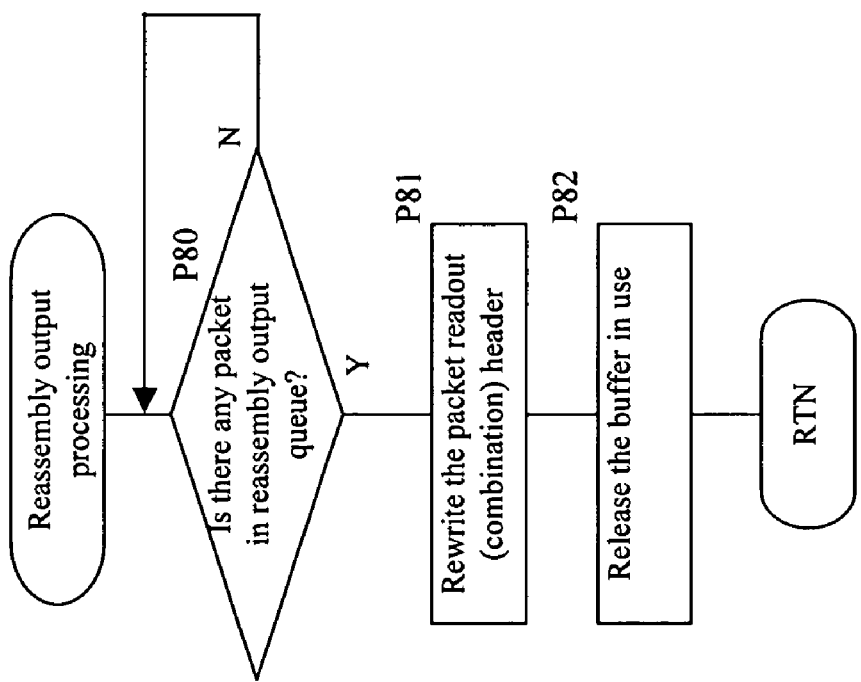
FIG. 16 shows an operation flow of reassembly output processing.

Further, FIG. 16 is a processing flow of the two-fragmented-packet reassembly output processor 41. As shown in FIG. 11B, if there is any packet in the software hop output queue SHQ ('Y' in process step P80), the packet readout (combination) header is rewritten (process step P81), and the buffer in use is released (process step P82).

Figure 17:
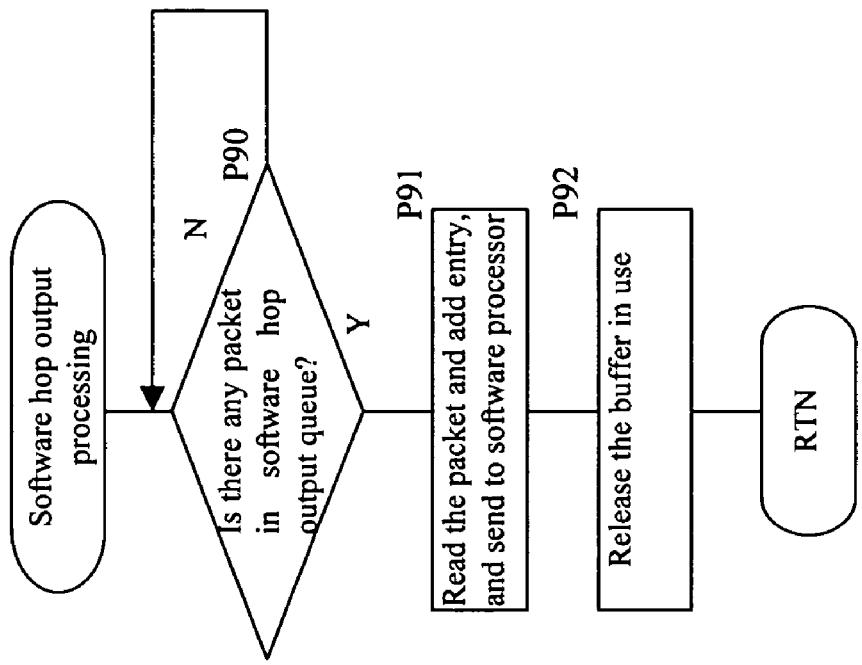
FIG. 17 shows an operation flow of software hop output processing.

Also, FIG. 17 is a processing flow of the software hop output processing performed by software hop output processor 42. If there is any packet in the software hop output queue SHQ ('Y' in process step P90), the packet readout entry is added (process step P91), and the buffer in use is released (process step P92).

FIGS. 18A to 18D are an exemplary notification of fragment identification information to software processor 8 when the software hop processing is performed for the packet fragmented into three or more, according to the embodiment of the present invention. As shown in FIG. 18A, the assembly management information corresponding to the entry is stored in assembly management memory 44 provided correspondingly to each entry, and when the software hop is decided, an identification ID is added to each fragment.

Further, buffer management memory information shown in FIG. 18B is stored into buffer management memory 20 correspondingly to each buffer. Before loading onto the software hop output queue SHQ, a control flag and a fragment identification ID are written.

The packet data output from software hop output processor 42 for the packet fragmented into three or more packets is transferred with DMA to the buffer memory in software processor 8 by means of a DMA controller in interface 7. Further, software hop report information shown in FIG. 18C is stored in interface 7 on a software hop basis, which is read and processed by CPU in software processor 8.

Figure 19:
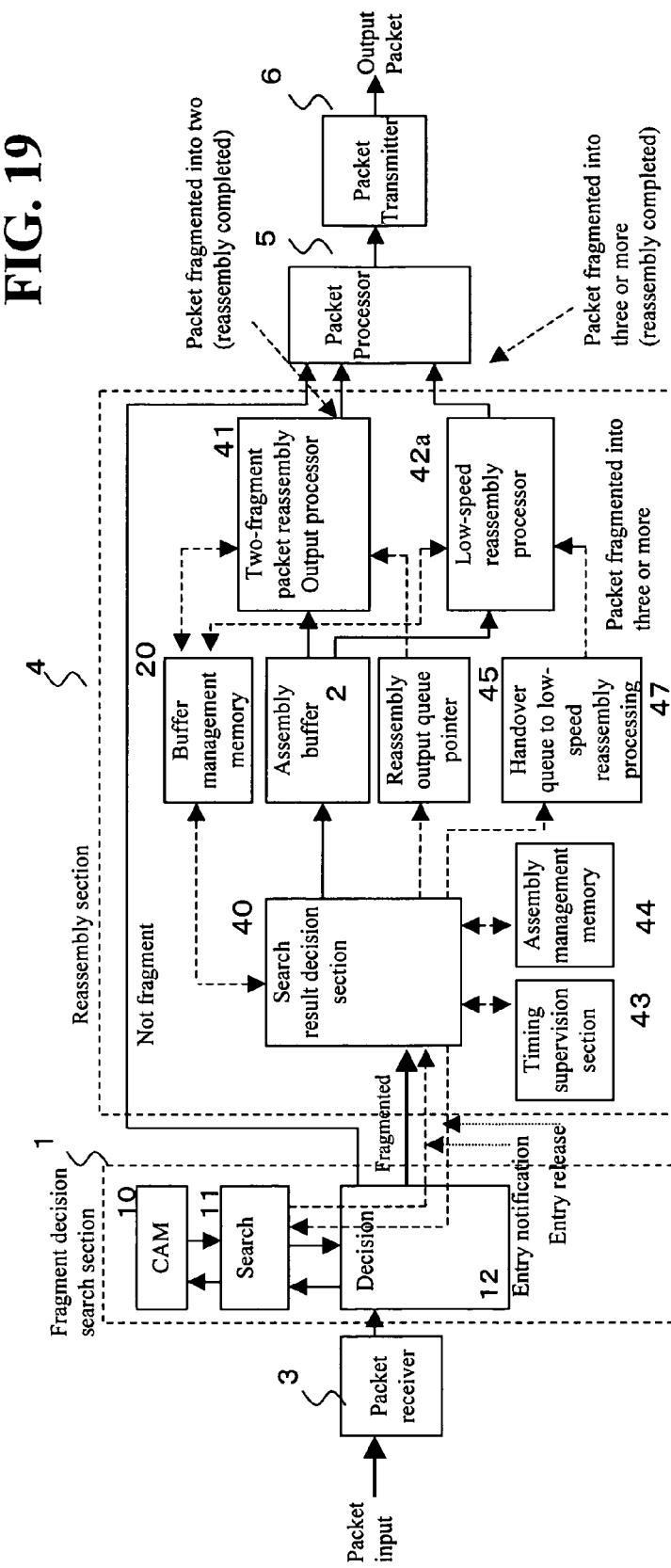
FIG. 19 shows a diagram illustrating packet transfer equipment which performs reassembly processing according to a second embodiment of the present invention.

FIG. 19 is a diagram illustrating a packet transfer equipment configuration according to a second embodiment of the present invention, in which reassembly processing for the packets of three fragments or more is performed by hardware using the above method 3).

Figure 5:
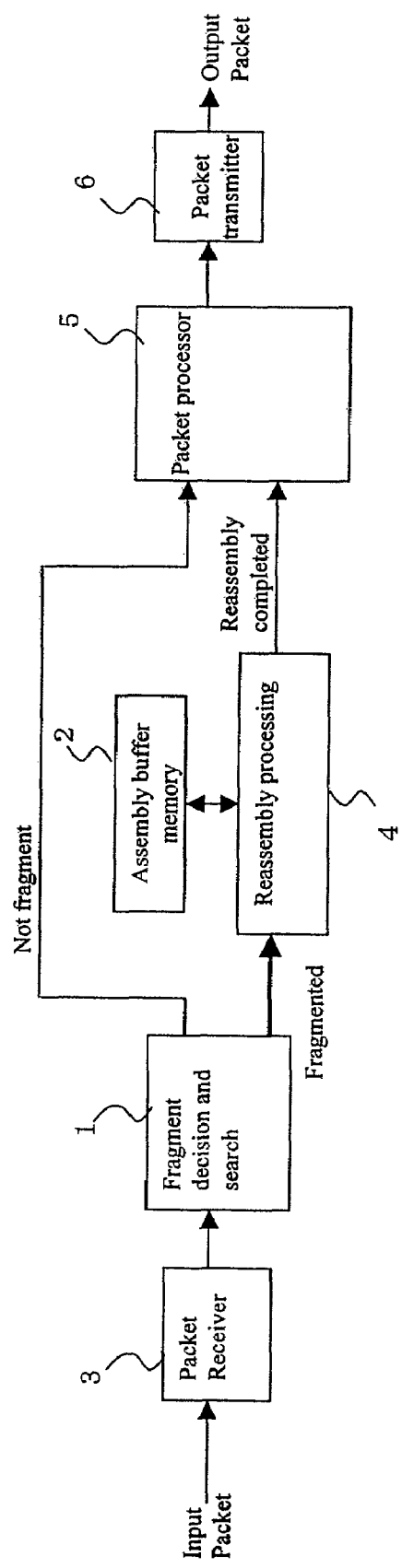
FIG. 5 shows an exemplary configuration of packet transfer equipment on the reception side, to which the reassembly processing (S3) shown in FIG. 4 is applied.
Figure 6:
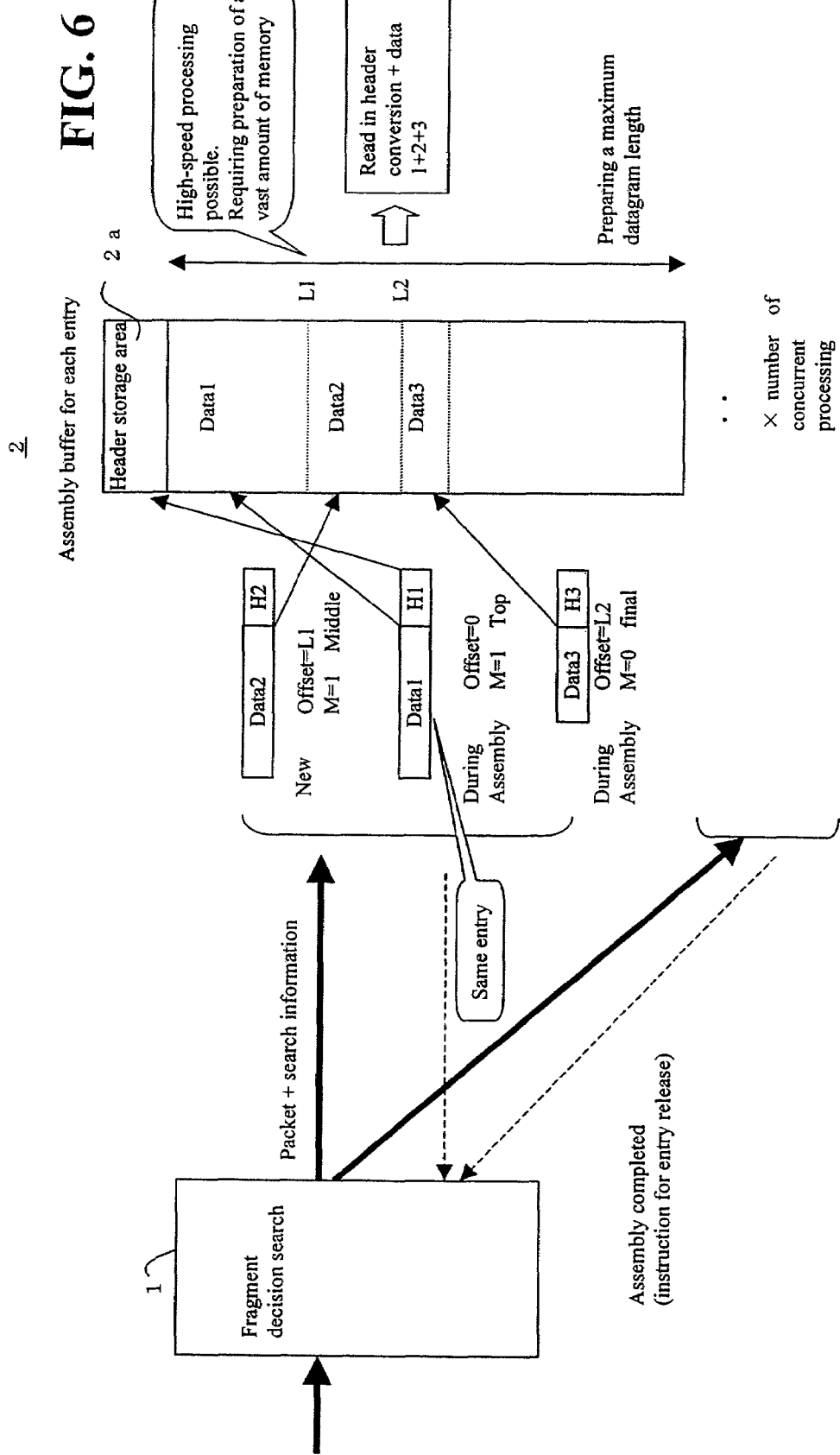
FIG. 6 shows an explanation diagram of the reassembly processing shown in FIGS. 4 and 5.
Figure 7:
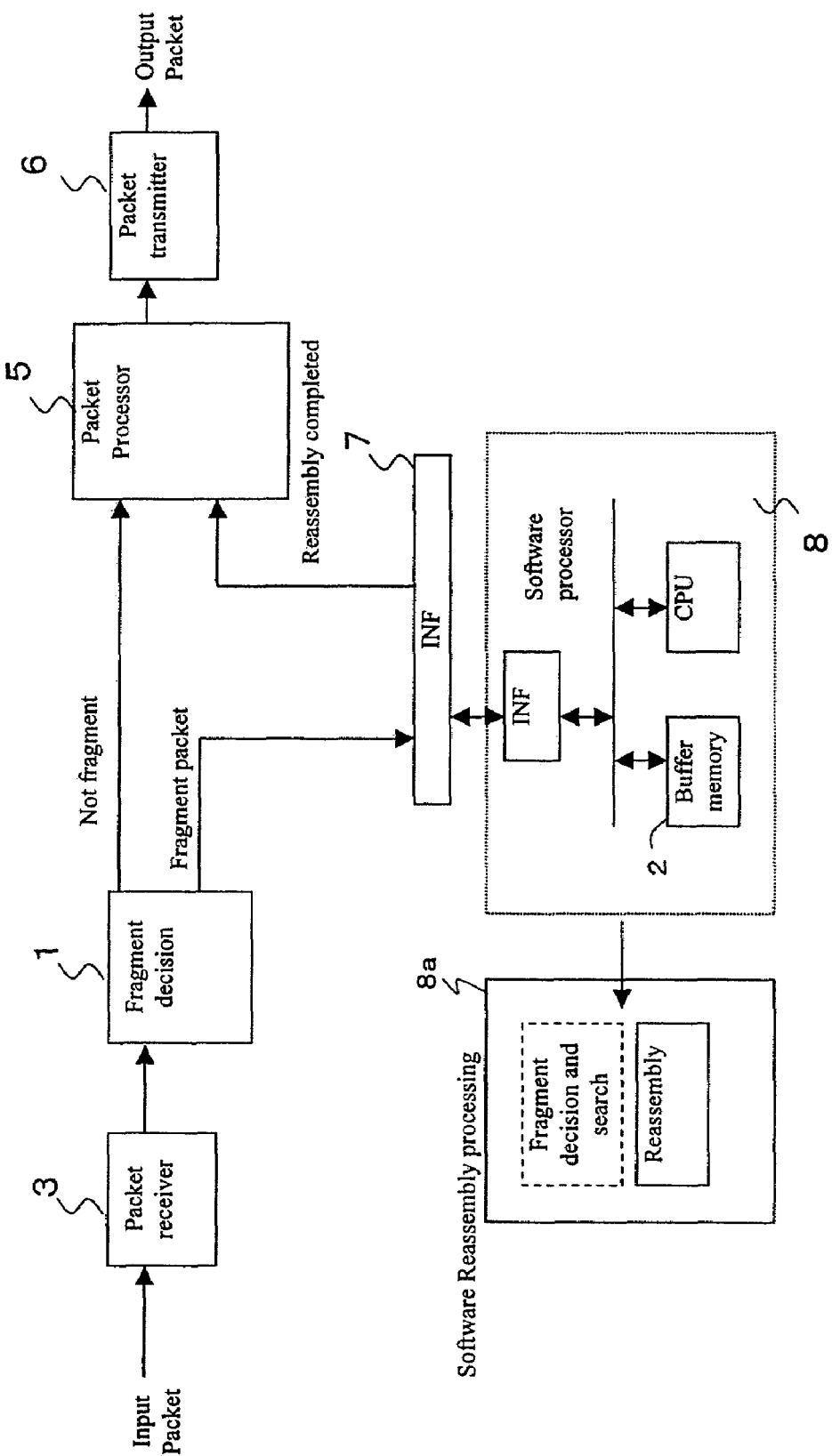
FIG. 7 shows another configuration example of the packet transfer equipment on the reception side, to which the reassembly processing (S3) is applied.

In addition, with the combination of the aforementioned first embodiment of the present invention, more effective use of hardware memory can be attained with the provision of low-speed hardware processing for a packet having the packet length prior to the fragmentation exceeding a predetermined value. As compared with the conventional configuration shown in FIG. 5, the assembly buffer capacity for reassembly can be decreased to approximately one-eighth.

In this second embodiment of the present invention shown in FIG. 19, two-fragmented-packet reassembly output processor 41 is identical to the two-fragmented-packet reassembly output processor having been explained in connection with FIG. 9. A feature is that an offset value for fragment decision in low-speed processing is added to the information in buffer management memory 20.

Figure 20A:
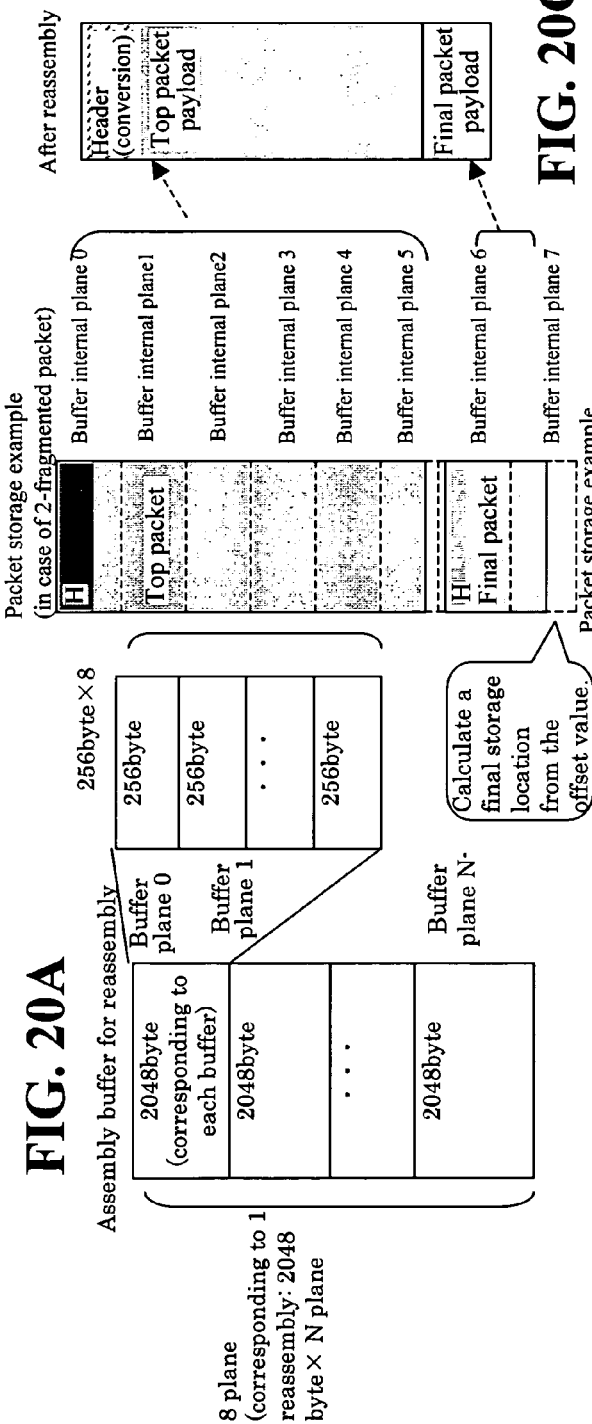
FIGS. 20A to 20C show a configuration example of buffer memory 2 according to the second embodiment of the present invention.
Figure 20C:
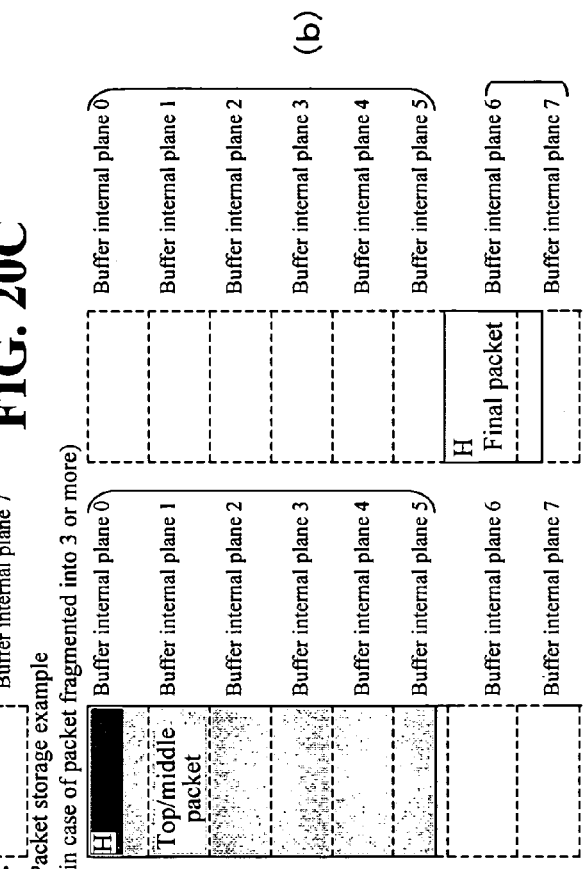
Figure 20B:
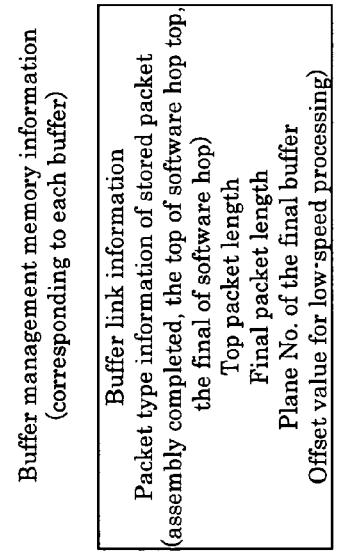
Figure 22:
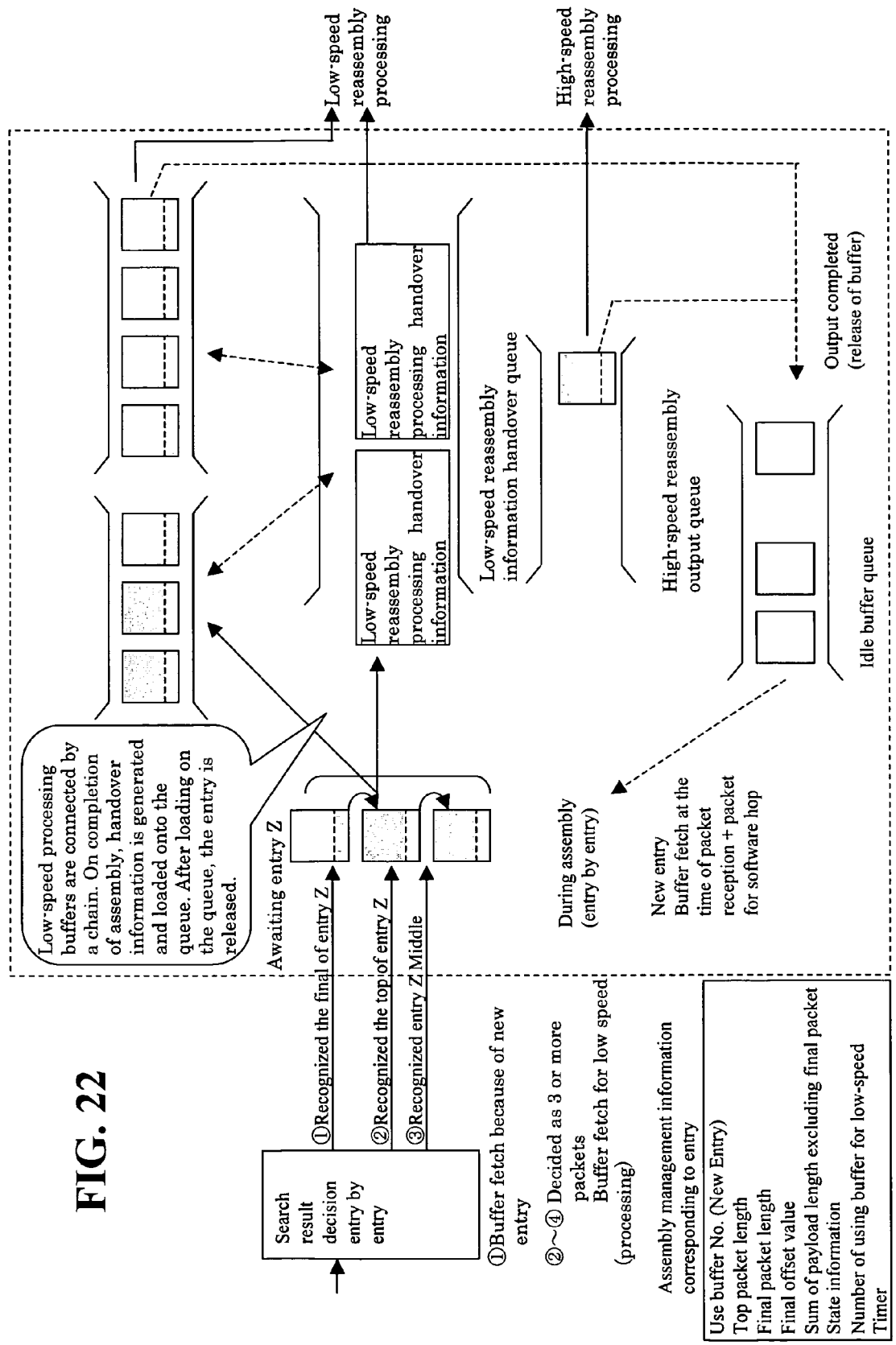
FIG. 22 shows a diagram illustrating buffer control for a packet fragmented into three or more packets according to the second embodiment of the present invention.

FIGS. 20A to 20C are a configuration example of buffer memory 2 according to the second embodiment of the present invention. FIG. 21 is a diagram illustrating writing a packet fragmented into three or more packets into a buffer. Further, FIG. 22 is a diagram illustrating buffer control for a packet fragmented into three or more packets according to the second embodiment of the present invention.

In the second embodiment, the processing for a packet fragmented into two is identical to the processing described earlier in the first embodiment (FIG. 12B).

As to the packet fragmented into three or more, as shown in FIG. 21, the packet is stored into the buffer on a fragmented packet basis. The buffers to which writing is completed are chain-connected using buffer management memory 20 in order of reception, and are handed over to a low-speed reassembly processing handover queue LQ. After the assembly is completed, the buffers are handed over to a low-speed reassembly processor 42a as a set of chained buffer information. At this point, the entry for high-speed processing is released.

Figure 23:
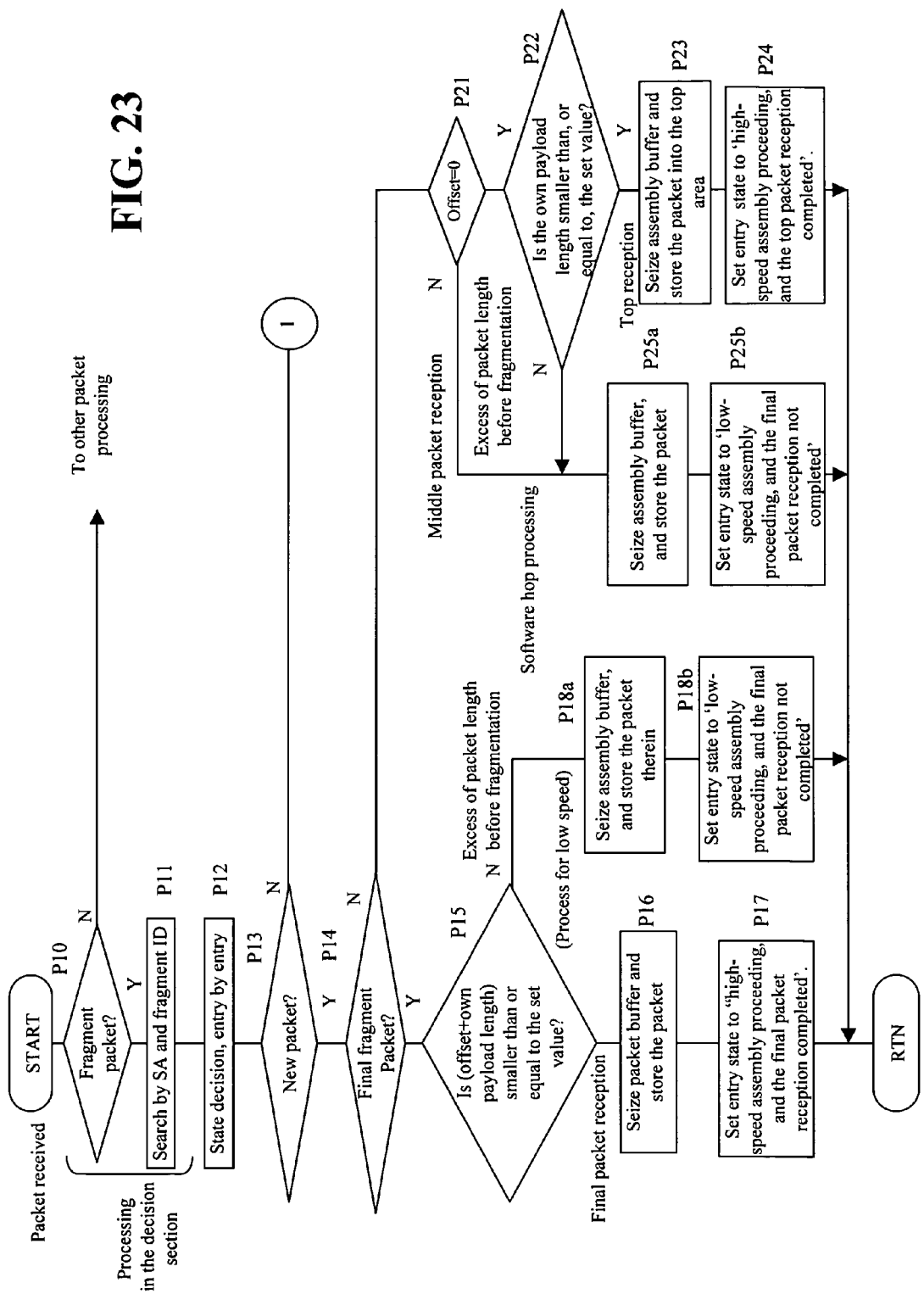
FIG. 23 shows a flowchart (part 1) representing search decision and assembly control processing according to the second embodiment of the present invention.
Figure 24:
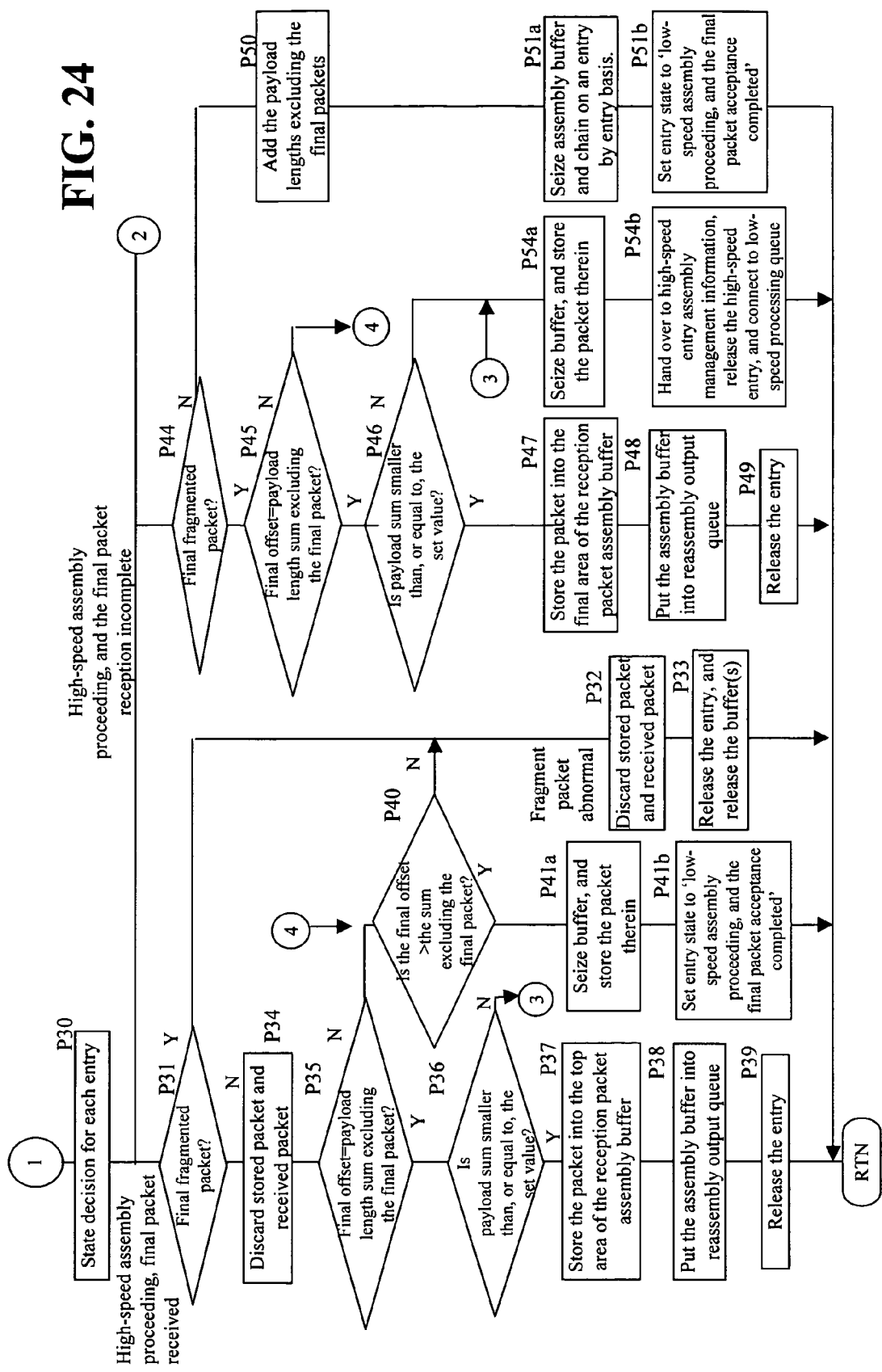
FIG. 24 shows a flowchart (part 2) representing search decision and assembly control processing according to the second embodiment of the present invention.
Figure 25:
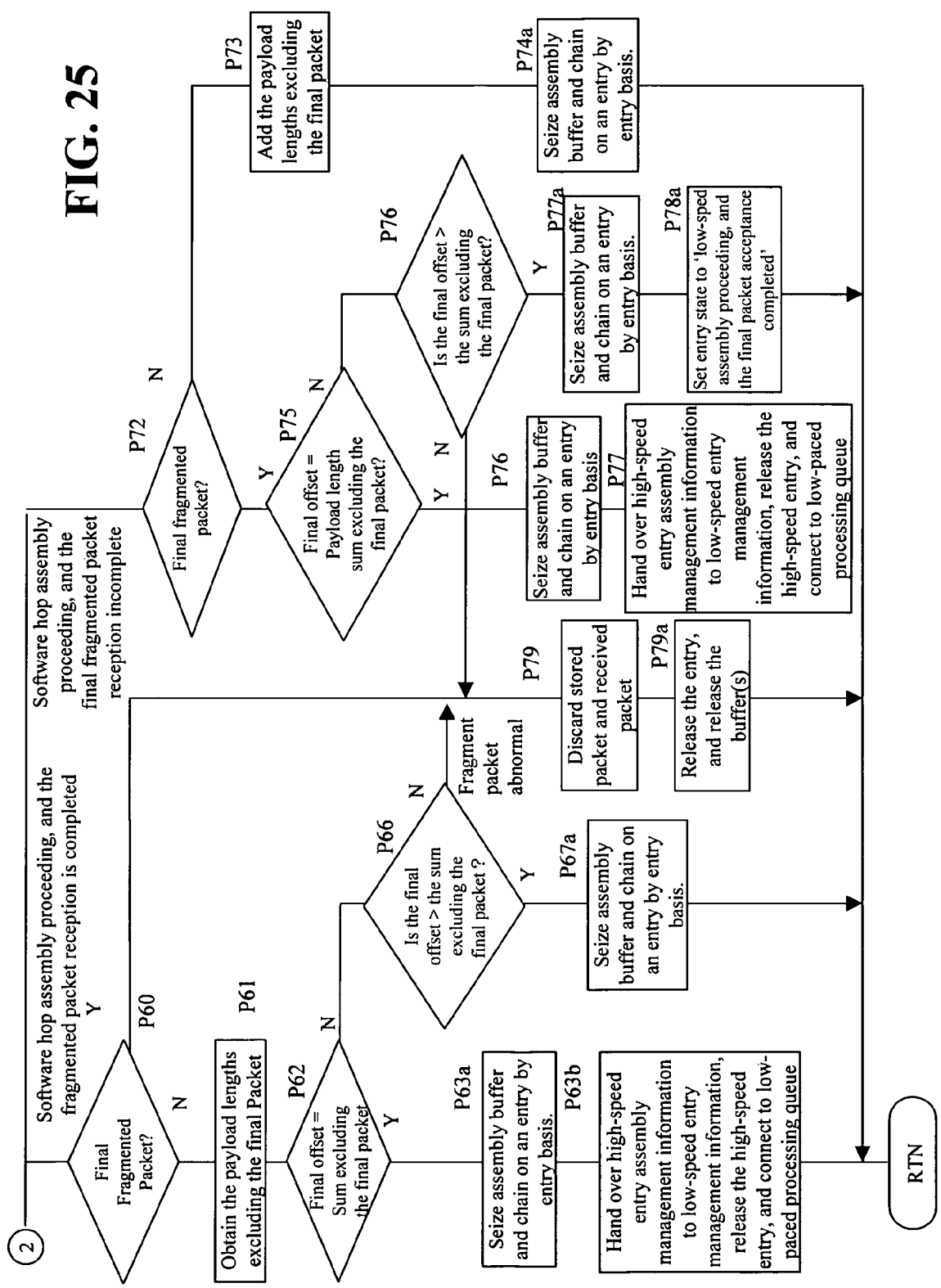
FIG. 25 shows a flowchart (part 3) representing search decision and assembly control processing according to the second embodiment of the present invention.

FIGS. 23 through 25 are flowcharts representing the search decision and assembly control processing according to the second embodiment of the present invention. These figures correspond to FIGS. 13 through 15 which illustrate the processing flow of the first embodiment. In this second embodiment, differently from the first embodiment, software hop processing in software processor 8 is not performed in the processing for the packet fragmented into three or more packets. Instead, the packet fragmented into three or more packets is processed by hardware in a low-speed reassembly processor 42a. Namely, the software hop process of steps P18-P20 and P25-P27 in FIG. 13 are replaced by the low-speed process steps P18a-P18b and P25a-P25b, respectively.

Similarly, in FIG. 24, the software hop output queue for the software hop processing shown in FIG. 14 is not provided. In low-speed reassembly processor 42a, the packet to be processed is chain-connected on an entry-by-entry basis. More specifically, the process steps P41a-P41b, P54a-P54b and P51a-P51b differ from the corresponding process steps shown in FIG. 14. Also, in FIG. 25, as compared with FIG. 15, process steps P63a-P63b, P67a, P74a, P77a-P78a and P79-P79a are different from the steps provided in the first embodiment.

Figure 26:
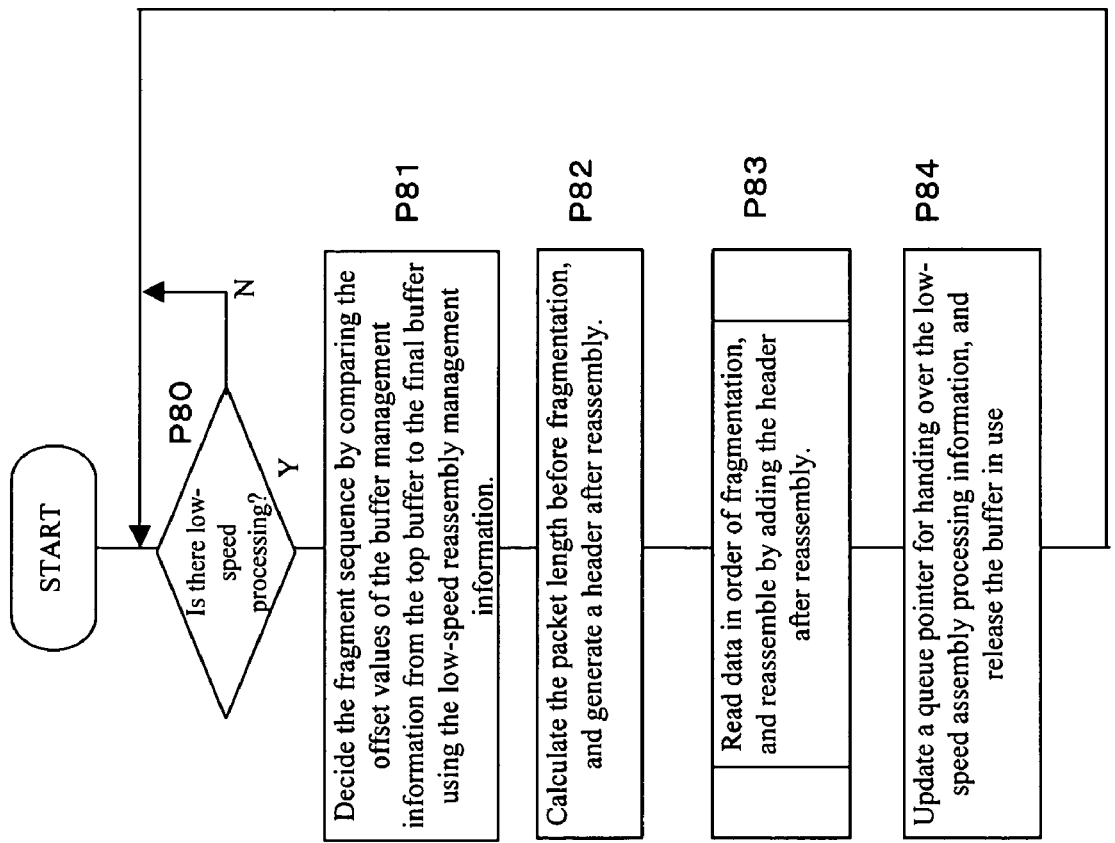
FIG. 26 shows low-speed reassembly processing in reassembly section 4 according to the second embodiment of the present invention.

FIG. 26 is a flowchart representing low-speed reassembly processing performed in reassembly section 4 in the second embodiment of the present invention. It is decided whether low-speed processing or handover processing is necessary, and if there is any packet awaiting low-speed processing ('Y' in process step P80), the fragment sequence is decided by comparing the offset values of the buffer management information from the top buffer to the final buffer using the low-speed reassembly management information stored in assembly management memory 44 (process step P81).

Subsequently, the packet length before fragmentation is calculated, and a header after reassembly is generated (process step P82). Packets are read in from buffer memory 2 in order of fragmentation, and the reassembly is performed by adding the header after reassembly calculated above (process step P83). Thereafter, a queue pointer 47 for handing over the low-speed assembly processing information, and the buffer in use is released (process step P84).

In the above description of the embodiments, for the received packet, there has been explained an example of identifying whether the packet is fragmented into two from the original packet, or the packet is fragmented into three or more. However, the application of the present invention is not limited to the above example. Namely, it is possible to perform processing by means of hardware, so that it is identified whether the received packet is fragmented into a predetermined number, for example, three from the an original packet, or the packet is fragmented into more than the above predetermined number, that is, four or more. Then, for the packet identified as being fragmented into the predetermined number, the processing is performed by securing buffers sufficient for storing the predetermined number of fragmented packets so as to store the above identified packets fragmented into the predetermined number, storing the identified packets being fragmented into the predetermined number into an assembly buffer in the order of being fragmented, and reading out the stored packets successively from the top.

More specifically, in case that the packet is fragmented into three, if the fragmented top packet and the fragmented end packet can be identified, it is easily possible to identify another packet as a middle packet. Thus, it is possible to store the fragmented packets into the assembly buffer in order of fragmentation.

Further, in the above description of the embodiments, there has been described the packet transfer equipment to be used for each node A, B being connected to IP tunnel 100 shown in FIG. 1. However, the application of the present invention is not limited to such a network configuration.

Figure 27:
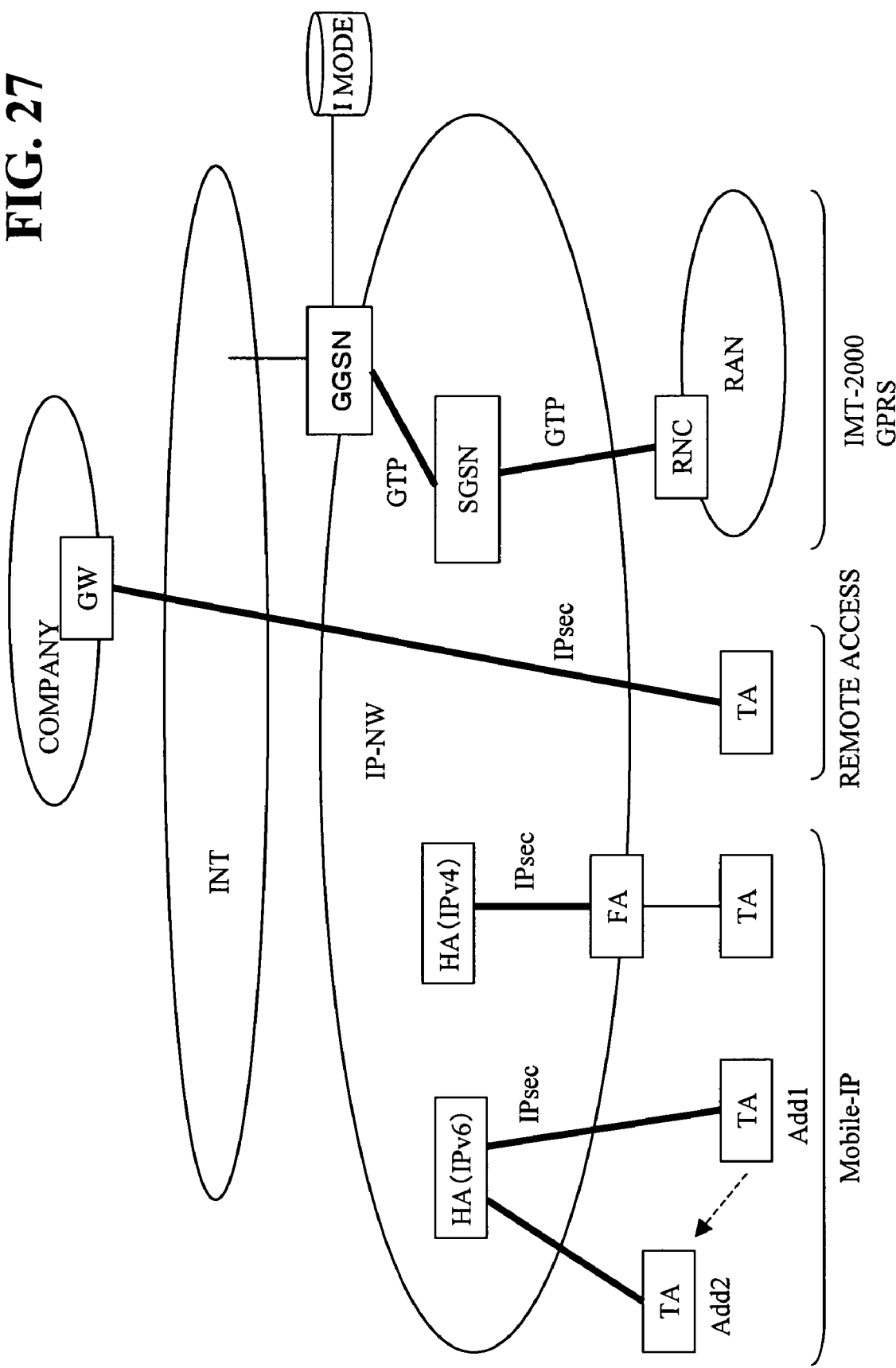
FIG. 27 shows a diagram illustrating an available application example of the present invention.

FIG. 27 shows a diagram illustrating an application example to which the present invention is available. In FIG. 27, first, the present invention is applicable to Mobile IP being connected to an IP network (IP-NW). Here, Mobile IP specifies a method for automating IP address management when a mobile terminal TA moves in the IP network, as well as a method for transferring communication packets to the moving mobile terminal. In a home agent HA, a home address ADD1 and an address ADD2 after the movement are registered and managed in regard to the mobile terminal TA.

Further, in case of IPv6, tunneling is performed between the home agent HA and the mobile terminal TA for an encapsulated data, using IPsec (Security Architecture for IP). Also, in case of IPv4, the mobile terminal TA (Foreign Agent) and the home agent HA are connected through an external agent FA (Foreign Agent), and tunneling is performed between the external agent FA (Foreign Agent) and the home agent HA by use of IP Sec.

Accordingly, in FIG. 27, when applying the present invention in the case of IPv6, the mobile terminal TA and the home agent HA correspond to packet transfer equipment in the node A and the node B shown in FIG. 1. Also, in the case of IPv4, the external agent FA (Foreign Agent) and the home agent HA correspond to the node A and the node B shown in FIG. 1. In such a way, the present invention can be applied.

Further, in FIG. 27, when it is configured such that remote access is made from a terminal TA to a gateway GW of a corporate intranet through the Internet INT, a tunnel is established between the terminal TA and the gateway GW by use of IP Sec (Security Architecture for IP). In such a configuration, the terminal TA and the gateway GW correspond to the packet transfer equipment provided in the node A and the node B shown in FIG. 1. Under such a correspondence, the present invention can be applied.

Further, in GPRS (General Packet Radio Service), which provides an IP network service for the users of mobile equipment including a portable telephone, GTP (GPRS Tunneling Protocol) is adopted as a protocol for maintaining communication with mobile equipment moving in the network. Accordingly, a tunnel is established between an RNC (Radio Network Controller), being connected to a base station to which the mobile equipment is subordinate, and an SGSN (Serving GPRS Support Node). When the mobile equipment moves and is handed over to a neighboring area, the communication is maintained by reestablishing a tunnel with an RNC in the new area.

Moreover, a tunnel is also established between a GGSN (Gateway GPRS Support Node), which acts as a connection point to the Internet INT or the intranet, and the SGSN. When the mobile equipment moves to an area being managed under the control of another SGSN, reestablishment of the tunnel is performed not only between the RNC and the SGSN, but also between the SGSN and the GGSN.

In such GPRS, the RNC, the SGSN and the GGSN correspond to the packet transfer equipment in the node A and the node B shown in FIG. 1. Under such a correspondence, the present invention can be applied.

To summarize, according to the present invention, in packet transfer equipment transferring an encrypted packet at high speed through in an IP tunnel, packet reassembly of the entire fragmented packets including a long packet can be performed using a relatively small amount of memory by effective use of an assembly buffer for reassembly.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A processing method of a fragmented packet in packet transfer equipment for transmitting and receiving a packet data through a network, comprising:
   receiving a packet;
   identifying whether the received packet is a packet fragmented into a predetermined number from an original packet, or a packet fragmented into more than the predetermined number;
   for the packet identified as being fragmented into the predetermined number, securing in advance a buffer capable of storing the packets fragmented into the predetermined number, storing the packets fragmented into the predetermined number into an assembly buffer in order of fragmentation, and successively reading out from the top; and
   for the packet fragmented into more than the predetermined number, transferring the received packet to a software processor, and reassembling the packets fragmented into more than the predetermined number in the software processor;
   wherein said reassembling step for the packet fragmented into three or more further includes the steps of:
   chain-connecting the assembly buffers;
   storing the packets therein in order of reception;
   deciding the sequence by comparing chain information and the offset values of the fragmented packets within the chain after receipt of the entire fragmented packets; and
   reading out the packets.

2. A processing method of a fragmented packet in packet transfer equipment for transmitting and receiving a packet data through a network, comprising
   receiving a packet;
   identifying whether the received packet is a packet fragmented into two from an original packet, or a packet fragmented into three or more; and
   for the packet identified as being fragmented into two, securing in advance a buffer capable of storing two fragmented packets, storing the two fragmented packets into an assembly buffer in order of fragmentation, on a basis of the respective offset values in the packets, and successively reading out from the top; and
   for the packet fragmented into three or more, transferring the received packet to a software processor, and reassembling the packets fragmented into three or more in the software processor;
   wherein said reassembling step for the packet fragmented into three or more further includes the steps of:
   chain-connecting the assembly buffers;
   storing the packets therein in order of reception;
   deciding the sequence by comparing chain information and the offset values of the fragmented packets within the chain after receipt of the entire fragmented packets; and
   reading out the packets.

3. A processing method of a fragmented packet in packet transfer equipment for transmitting and receiving a packet data through a network, comprising:
   receiving a packet;
   identifying whether the received packet is a packet fragmented into two from an original packet, or a packet fragmented into three or more;
   for the packet identified as being fragmented into two, securing in advance a buffer capable of storing two fragmented packets, storing the two fragmented packets into an assembly buffer in order of fragmentation, on a basis of the respective offset values in the packets, and reading out from the top; and
   for the packet fragmented into three or more, transferring the received packet to a software processor, and reassembling the packets fragmented into three or more in the software processor;
   wherein said reassembling step for the packet fragmented into three or more further includes the steps of:
   chain-connecting the assembly buffers;
   storing the packets therein in order of reception;
   deciding the sequence by comparing chain information and the offset values of the fragmented packets within the chain after receipt of the entire fragmented packets; and
   reading out the packets.

4. A processing method of a fragmented packet in packet transfer equipment for transmitting and receiving a packet data through a network, comprising:
   receiving a packet;
   identifying whether the received packet is a packet fragmented into two from an original packet, and of which the original packet length is no greater than a predetermined value, or a packet fragmented into three or more;
   for the packet identified as being fragmented into two, and of which the original packet length is no greater than a predetermined value, securing in advance a buffer capable of storing two fragmented packets, storing the two fragmented packets into an assembly buffer in order of fragmentation, on a basis of the respective offset values in the packets, and reading out from the top; and
   for the packet fragmented into three or more, and the packet fragmented into two of which the original packet length is greater than a predetermined value, transferring the received packet to a software processor, and reassembling in the software processor the packets fragmented into three or more, and the packets fragmented into two of which the original packet length is greater than a predetermined value;
   wherein said reassembling step for the packet fragmented into three or more further includes the steps of:
   chain-connecting the assembly buffers;
   storing the packets therein in order of reception;
   deciding the sequence by comparing chain information and the offset values of the fragmented packets within the chain after receipt of the entire fragmented packets; and
   reading out the packets.

5. The processing method of a fragmented packet according to claim 4, wherein, said reassembling step for the packet fragmented into three or more, and the packet fragmented into two of which the original packet length is greater than a predetermined value, further includes the steps of:

chain-connecting the assembly buffers;

storing the packets therein in order of reception;

deciding the sequence by comparing chain information and the offset values of the fragmented packets within the chain after receipt of the entire fragmented packets; and reading out the packets.

6. Packet transfer equipment transmitting and receiving a packet data through a network, comprising:

a packet receiver;

a fragment decision search section deciding the packet received in the receiver whether or not the received packet is a fragmented packet, and for the fragmented packet, searching and adding an entry for each packet before fragmentation; and a reassembly section reassembling the packets on an entry-by-entry basis, wherein the reassembly section includes:

a decision section deciding whether the fragmented packet is a packet fragmented into a predetermined number from an original packet, or a packet fragmented into more than the predetermined number, and a buffer memory having a buffer for storing the packets decided as being fragmented into the predetermined number in order of fragmentation, and a plurality of buffers for storing the packets fragmented into more than the predetermined number, respectively;

a first output processor reading out the packet fragmented into the predetermined number stored in the buffer from the top; and for the packet fragmented into more than the predetermined number, a second output processor for the packet fragmented into more than the predetermined number, performing reception supervision of the entire fragmented packets only, and transferring the received packets from the plurality of buffers, said packet transfer equipment further comprising:

a software processor performing reassembly of the packets fragmented into more than the predetermined number, which are transferred from the second output processor; and a packet processor multiplexing and outputting the reassembled packets fed from the first output processor and the software processor.

7. Packet transfer equipment transmitting and receiving a packet data through a network, comprising:

a packet receiver;

a fragment decision search section deciding the packet received in the receiver whether or not the received packet is a fragmented packet, and for the fragmented packet, searching and adding an entry for each packet before fragmentation; and a reassembly section reassembling the packets on an entry-by-entry basis, wherein the reassembly section includes:

a decision section deciding whether the fragmented packet is a packet fragmented into two from an original packet, or a packet fragmented into three or more;

a buffer memory having a buffer for storing the packet decided as being fragmented into two in order of fragmentation, and a plurality of buffers for storing the packet fragmented into three or more, respectively;

a first output processor reading out the packet fragmented into two, and stored in the buffer, successively from the top; and a second output processor for the packet fragmented into three or more, performing reception supervision of the entire fragmented packets only, and transferring the received packet from the plurality of buffers, said packet transfer equipment further comprising:

a software processor performing reassembly of the packets fragmented into three or more, which are transferred from the second output processor; and a packet processor multiplexing and outputting the reassembled packets fed from the first output processor and the software processor.

8. Packet transfer equipment transmitting and receiving a packet data through a network, comprising:

a packet receiver;

a fragment decision search section deciding the packet received in the receiver whether or not the received packet is a fragmented packet, and for the fragmented packet, searching and adding an entry for each packet before fragmentation; and a reassembly section reassembling the packets on an entry-by-entry basis, wherein the reassembly section includes:

a decision section deciding whether or not the fragmented packet is a packet which is fragmented into two from an original packet, and of which the original packet length is no greater than a predetermined value;

a buffer memory having a first buffer for storing the packet which is decided as being fragmented into two, and of which the original packet length is no greater than a predetermined value, in order of fragmentation, and a plurality of second buffers for storing the packet fragmented into three or more, and the packet fragmented into two of which the original packet length is greater than a predetermined value, respectively;

a first output processor reading out the packet fragmented into two and stored in the first buffer from the top; and a second output processor for the packet fragmented into three or more, and the packet fragmented into two of which the original packet length is greater than the predetermined value, performing reception supervision of the entire fragmented packets only, and transferring the received packet from the plurality of second buffers, said packet transfer equipment further comprising:

a software processor performing reassembly of the packets fragmented into three or more, and the packets fragmented into two, of which the original packet length is greater than the predetermined value, which are transferred from the second output processor; and a packet processor multiplexing and outputting the reassembled packets fed from the first output processor and the software processor.

9. The packet transfer equipment according to either claim 7 or 8, wherein, for the fragmented packet transferred from the second output processor to the software processor, packet identification information is added based on an entry number handed over from the reassembly section to the second output processor, and in case that the second output processor detects abnormality in the fragmented packet to be transferred to the software processor, and that a portion of the fragmented packets is already transferred to the software processor, the reassembly section discards the fragmented packet of interest and notifies the software processor of the detected abnormality together with the packet identification information.

10. Packet transfer equipment transmitting and receiving a packet data through a network, comprising:

a packet receiver;

a fragment decision section identifying whether a packet received in the packet receiver is a packet fragmented into two from an original packet, or a packet fragmented into three or more; and a reassembly section reassembling the two fragmented packets identified in the fragment decision section, wherein the reassembly section includes:

a decision section deciding whether the fragmented packet is a packet fragmented into two from an original packet, or a packet fragmented into three or more;

a buffer memory having a buffer for storing the packet decided as being fragmented into two in order of fragmentation, and a plurality of buffers for storing the packets fragmented into three or more, respectively;

a first output processor reading out the packet fragmented into two stored in the buffer of the buffer memory from the top; and for the packet fragmented into three or more, a second output processor having a means for storing the packets into the buffer in order of reception by successively chaining the plurality of buffers in the buffer memory, and after storing the entire fragmented packets into the buffer, handing over buffer chain information while preserving the packet stored in the buffer and packet information in the buffer without modification, whereby the order of fragmentation is decided based on the buffer chain information and the packet information in the buffer entry by entry, which are handed over from the second output processor, and the packets are read out from the buffer memory in order of fragmentation.

11. Packet transfer equipment transmitting and receiving a packet data between terminals through a network according to claim 10, comprising:

a packet receiver;

for the packet received in the receiver, a fragment decision search section deciding whether or not the received packet is a fragmented packet, and for the fragmented packet, searching and adding an entry for each packet before fragmentation; and a reassembly section reassembling the packets on an entry-by-entry basis, wherein the reassembly section includes:

a decision section deciding whether or not the fragmented packet is a packet fragmented into two from an original packet, and of which the original packet length is no greater than a predetermined value;

a buffer memory having a first buffer for storing the decided packet which is fragmented into two, and of which the original packet length is no greater than a predetermined value, in order of fragmentation, and a plurality of second buffers for storing the packet fragmented into three or more, and the packet fragmented into two of which the original packet length is greater than the predetermined value, respectively;

a first output processor reading out the packet fragmented into two stored in the buffer of the buffer memory from the top; and a second output processor for the packet fragmented into three or more, and the packet fragmented into two of which the original packet length is greater than the predetermined value, having a means for storing the packets into the buffer in order of reception by successively chaining the plurality of second buffers in the buffer memory, and after storing the entire fragmented packets into the plurality of second buffers, handing over buffer chain information while preserving the packet stored in the buffer and packet information in the buffer without modification, whereby the order of fragmentation is decided based on the buffer chain information and the packet information in the buffer entry by entry, which are handed over from the second output processor, and the packets are read out from the buffer memory in order of fragmentation.

* * * * *